US005907231A

United States Patent [19]

Watanabe et al.

[11] Patent Number: 5,907,231

[45] Date of Patent: May 25, 1999

[54] MAGNETIC COUPLING DEVICE FOR CHARGING AN ELECTRIC VEHICLE

[75] Inventors: Kunihiko Watanabe; Heiji Kuki, both of Yokkaichi; Shuji Arisaka; Toshiro Shimada, both of Osaka, all of Japan

[73] Assignees: Sumitomo Electriic Industries, Ltd., Osaka; Sumitomo Wiring Systems, Ltd., Mie, both of Japan

[21] Appl. No.: 08/882,149

[22] Filed: Jun. 25, 1997

[30] Foreign Application Priority Data

| | | | |
|---|---|---|---|
| Jun. 27, 1996 | [JP] | Japan | 8-167869 |
| Aug. 7, 1996 | [JP] | Japan | 8-208600 |
| Oct. 8, 1996 | [JP] | Japan | 8-267416 |
| Oct. 8, 1996 | [JP] | Japan | 8-267417 |

[51] Int. Cl.[6] .......... H01M 10/46

[52] U.S. Cl. .......... 320/108

[58] Field of Search .......... 320/104, 107, 320/108, 109, 101; 336/DIG. 2; D13/107, 108

[56] References Cited

U.S. PATENT DOCUMENTS

| | | | |
|---|---|---|---|
| 4,912,391 | 3/1990 | Meadows | 320/108 |
| 5,070,293 | 12/1991 | Ishii et al. | 320/108 |
| 5,216,402 | 6/1993 | Carosa . | |

FOREIGN PATENT DOCUMENTS

| | | |
|---|---|---|
| A1 0-540750 | 5/1993 | European Pat. Off. . |
| A 390020 | 9/1908 | France . |
| A 1-595881 | 6/1970 | France . |
| A 2-096183 | 2/1972 | France . |
| A 2-234472 | 1/1974 | Germany . |
| A 5-258962 | 10/1993 | Japan . |
| A 6-14470 | 1/1994 | Japan . |

*Primary Examiner*—Edward H. Tso

*Attorney, Agent, or Firm*—Oliff & Berridge, PLC.

[57] ABSTRACT

A magnetic coupling device for charging an electric vehicle includes: a primary unit having a primary core and a primary coil wound on the primary core; and a secondary unit having a secondary core and a secondary coil wound on the secondary core, the secondary unit disposed on the electric vehicle and coupled with the primary unit, so that the primary and secondary cores constitute a closed loop-like magnetic circuit; each of the primary and secondary cores having a junction face which contacts with each other under the coupling, wherein the junction faces of the primary and secondary cores have a mutually opposing relationship in which the junction faces intersect with an attaching direction of the primary unit.

10 Claims, 18 Drawing Sheets

MAGNETIC COUPLING DEVICE FOR CHARGING AN ELECTRIC VEHICLE

BACKGROUND OF THE INVENTION

1. Field of the Invention

The invention relates to a magnetic coupling device which is used for charging an electric vehicle by using electromagnetic induction.

2. Description of the Related Art

Recently, a system of the noncontact type which uses the electromagnetic induction as described above was developed. An example of such a system is disclosed in Japanese Patent Unexamined Publication No. Hei. 5-258962. In the disclosed system, as shown in FIG. 27, a secondary unit 1 is disposed on the body of an electric vehicle, a primary unit 6 connected to a charging power source 5 is set to the secondary unit 1 so as to attain the electromagnetic coupling state, and an AC current is then supplied to the primary unit 6, thereby generating an power on the side of the secondary unit 1.

In the system of the .related art, the secondary unit 1 is configured by forming a pair of case-like cores 2 in each of which one face is opened and a pair of secondary coils 3 housed therein, and causing the opened faces of the case-like cores 2 to oppose each other via a gap for inserting a primary coil 7.

Therefore, the secondary unit 1 requires the two sets of the core 2 and the secondary coil 3. This produces a problem in that the whole of the magnetic coupling device is large and heavy.

Furthermore, the coils 3 and 7 are coupled to each other by slidingly inserting the primary coil 7. Consequently, the secondary unit 1 must have a structure in which an insertion stroke is ensured so as to have a depth which corresponds at the minimum to the length of the primary coil 7. As a result, the depth of the secondary unit 1 which is to be disposed on a vehicle is increased, thereby producing a problem in that the magnetic coupling device is large as a whole.

In the configuration, the whole of the primary coil 7 is exposed. During a period when the device is handled in order to charge an electric vehicle, therefore, the coil is easily damaged. This produces another problem in that a countermeasure for protecting the coil must be taken.

Further, after the primary coil 7 is set to the secondary unit 1, by closing the gap between the pair of the case-like cores 2 by a switching device (not shown), the electromagnetic coupling state is attained. Therefore, the switching device has to be provided in the electric vehicle side, thereby causing the increase of the size of the magnetic coupling device in the electric vehicle side.

SUMMARY OF THE INVENTION

The invention has been conducted in view of the above-mentioned circumstances. It is an object of the invention to provide a magnetic coupling device for charging an electric vehicle in which the size and weight can be reduced as much as possible.

The foregoing object of the invention is achieved by providing a magnetic coupling device for charging an electric vehicle includes: a primary unit having a primary core and a primary coil wound on the primary core; and a secondary unit having a secondary core and a secondary coil wound on the secondary core, the secondary unit disposed on the electric vehicle and coupled with the primary unit, so that the primary and secondary cores constitute a closed loop-like magnetic circuit; each of the primary and secondary cores having a junction face which contacts with each other under the coupling, wherein the junction faces of the primary and secondary cores have a mutually opposing relationship in which the junction faces intersect with an attaching direction of the primary unit.

According to this configuration, since the junction faces of the cores have a mutually opposing relationship in which the faces intersect with the attaching direction, the coil units are opposed each other. As a result, the secondary unit is required only to form the space for attachment so as to be exposed to the outside of the vehicle, and hence the depth of the secondary unit can be largely reduced.

BRIEF DESCRIPTION OF THE DRAWING FIGURES

BRIEF DESCRIPTION OF THE PREFERRED EMBODIMENTS

<First embodiment>

Figure 1:
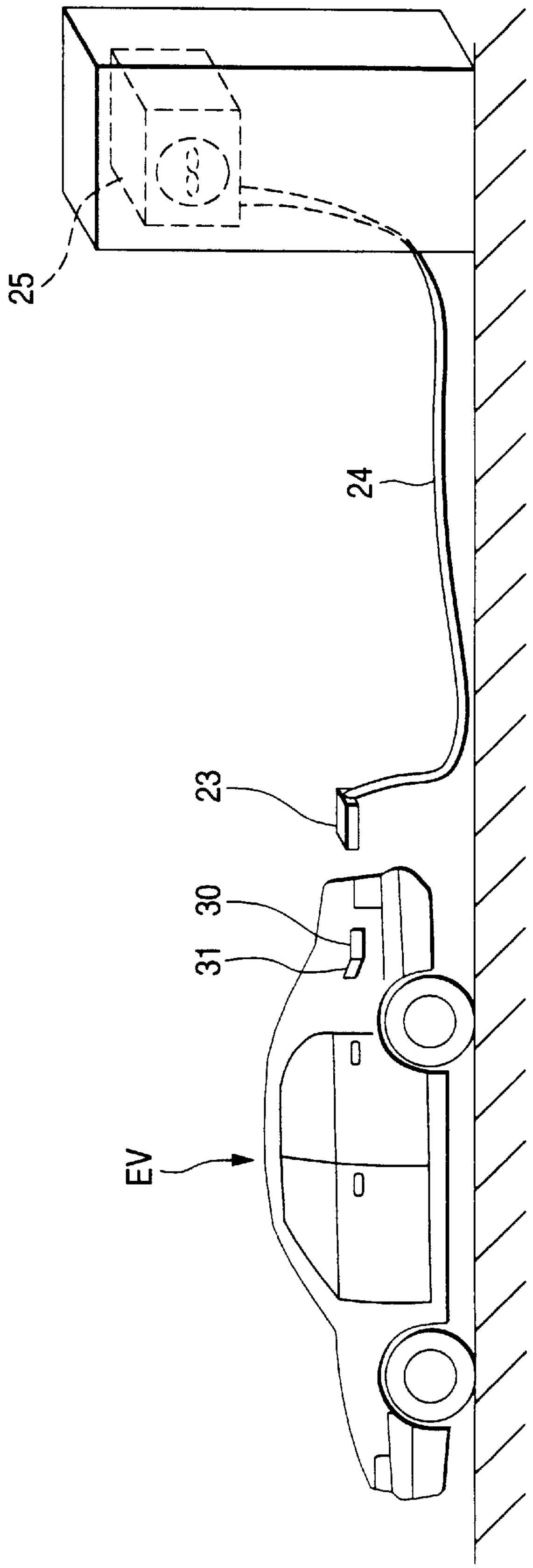
FIG. 1 is a side view diagrammatically showing a charging system according to the invention.

Hereinafter, a first embodiment of the invention will be described with reference to FIGS. 1 to 3.

A receiving unit 30 which outward opens is formed in the outer side face of the body of an electric vehicle EV. The opening face can be opened and closed by a lid 31. A secondary unit 20 which will be described later is disposed in the receiving unit 30.

The secondary unit 20 is configured by winding a secondary coil 22 on a secondary core 21 which is made of, for example, ferrite. The output terminals of the secondary coil 22 are connected to a charging circuit for charging a power battery (not shown) which is a power storage device of the electric vehicle, and a high-frequency electromotive force induced in the secondary coil 22 is rectified so as to be used for charging the power battery.

Figure 2:
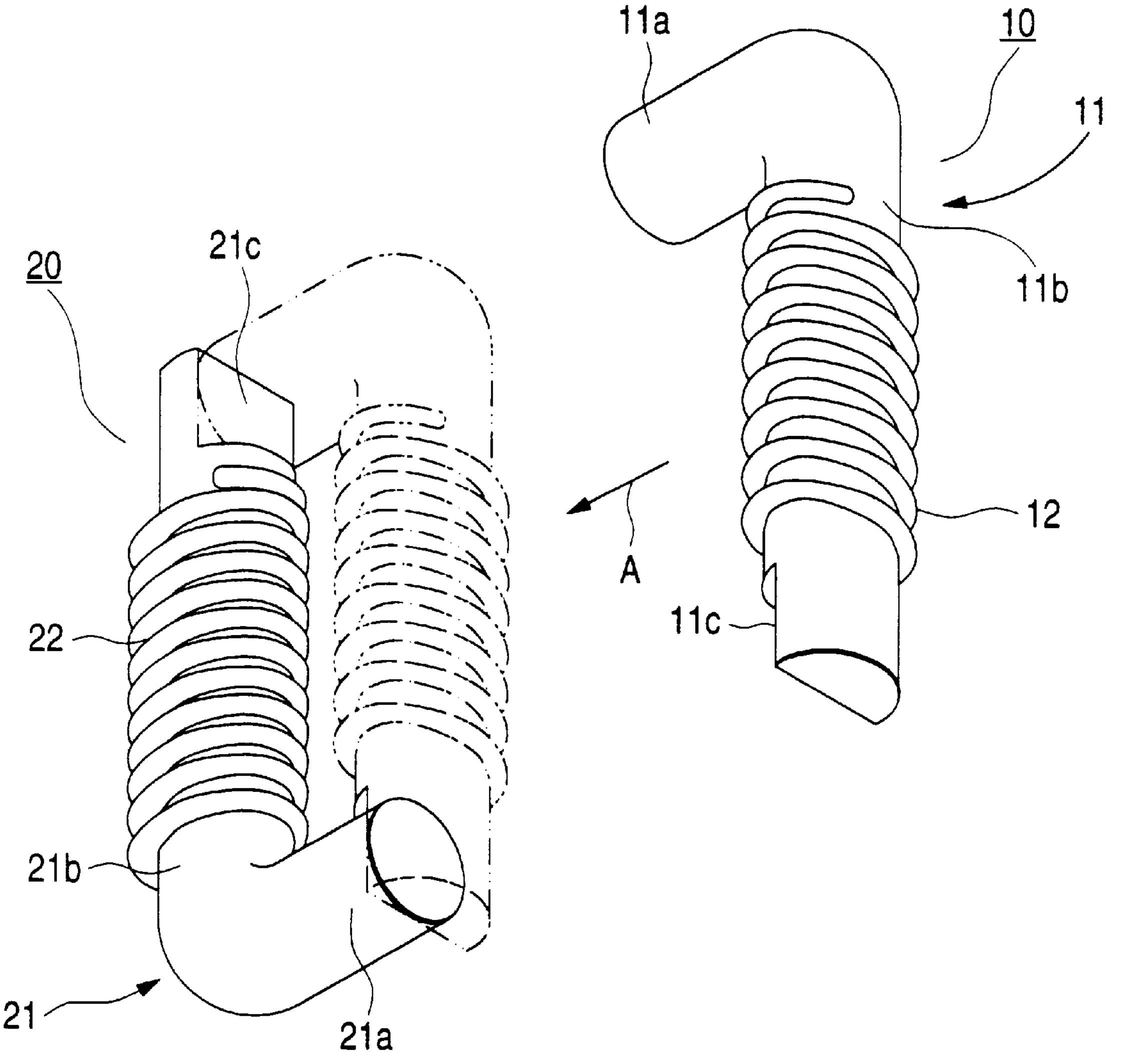
FIG. 2 is a perspective view showing primary and secondary coil units used in a first embodiment of the invention.

As shown in FIG. 2, the secondary core 21 has a shape obtained by bending a column into an L-like shape, as a whole. The short side of the L-like shape serves as a junction leg 21*a* which elongates in an attaching direction A along which a primary unit 10 is to be attached. The long side of the L-like shape which is continuous with the junction leg 21*a* in a bent state of about 90 deg. serves as a connecting portion 21*b*. A flat face 21*c* is formed at the tip end of the connecting portion 21*b* by removing away by a side half part of the tip end. Therefore, the width of the flat face 21*c* is equal to the diameter of the junction leg 21*a* and also to that of the connecting portion 21*b*, and the length of the flat face 21*c* in the direction along which the connecting portion 21*b* elongates is set to be equal to the diameter of the junction leg 21*a* and the connecting portion 21*b*. The secondary coil 22 is formed by winding a litz wire or the like in the form of a single layer and in a plural number of turns, and placed in an area of the connecting portion 21*b* of the secondary core 21 except for the flat face 21*c*.

Although not shown, the secondary core 21 and the secondary coil 22 are housed in a protective case made of a synthetic resin. The protective case is fixed to the receiving unit 30, thereby fixing the core and the coil to the body of the vehicle.

On the other hand, the primary unit 10 has a primary core 11 and a primary coil 12 which are configured in the same manner as the secondary core 21 and the secondary coil 22, respectively. That is, the primary core 11 has a junction leg 11*a* which elongates in the attaching direction of the primary unit 10, and a connecting portion 11*b* which is continuous with the junction leg 11*a* in a bent state of 90 deg. A flat face 11*c* is formed at the tip end of the connecting portion 11*b*, and the primary coil 12 is wound on the connecting portion 11*b* of the core 11. As shown in FIG. 1, the primary coil 12 is housed in a connector case 23 which is to be inserted into the receiving unit 30 of the electric vehicle EV, and connected to a charging power source 25 via a charging cable 24. The primary coil 12 is excited by a high-frequency current of, for example, 100 kHz.

Figure 3:
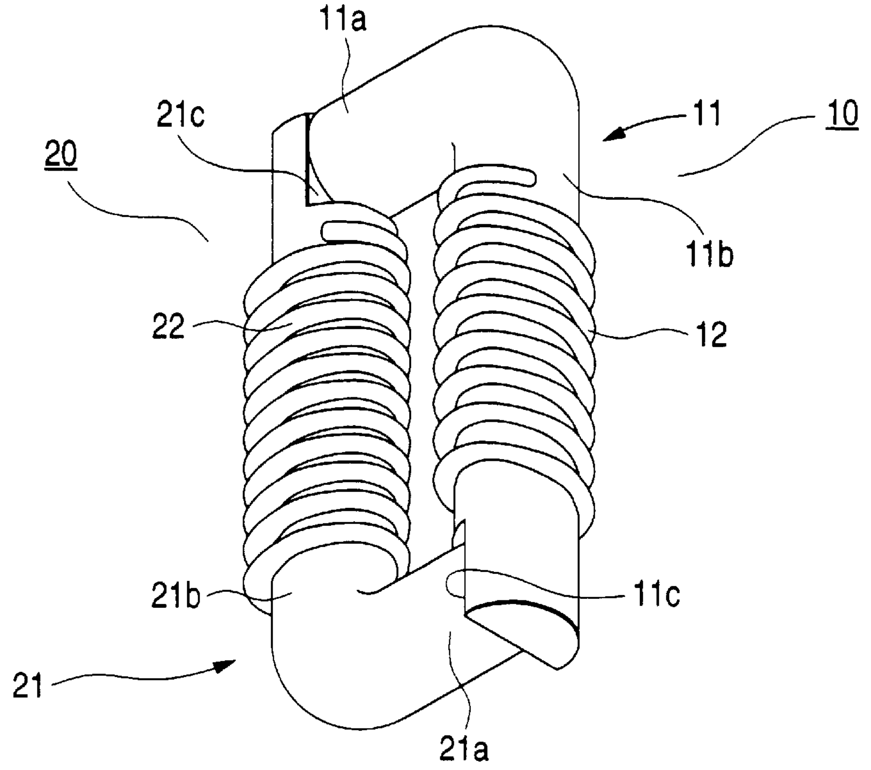
FIG. 3 is a perspective view of the coupling state in the embodiment.

When the connector case 23 is inserted into the receiving unit 30 in which the lid 31 is opened, the tip end face of the junction leg 11*a* of the primary core 11 abuts against the flat face 21*c* of the connecting portion 21*b* of the secondary core 21 as shown in FIG. 3, and the tip end face of the junction leg 21*a* of the secondary core 21 abuts against the flat face 11*c* of the connecting portion 11*b* of the primary core 11, thereby attaining a joined state. As a result, a magnetic circuit of a rectangular frame-like closed loop is formed by the cores 11 and 21.

Under this state, the junction faces of the cores 11 and 21 have a mutually opposing relationship in which the faces perpendicularly intersect with the attaching direction A, and hence the units 10 and 20 are opposed each other. Consequently, the secondary unit 20 is required only to form the space for attachment of the primary unit 10 so as to be openable to the outside of the vehicle, and the space for insertion of the primary unit 10 is not necessary. As a result, the depth of the secondary unit 20 can be largely reduced. Furthermore, since each of the coils 12 and 22 is wound by using a litz wire in the form of a single layer, the length in the axial direction of the coil is increased but the outer diameter is reduced, with the result that the depth of each of the primary and secondary units 10 and 20 in the attaching direction A can be further reduced. Although the axial length is increased by using the form of a single layer, the configuration in which the coils 12 and 22 are arranged in tandem in the attaching direction A allows the space formed between the cores 11 and 21 to be effectively used so that the device is compactly configured as a whole.

Since the cores 11 and 21 have a substantially L-like shape and the same size, the volume occupied by the cores 11 and 21 having a weight is minimum, and hence the weight of the device can be reduced. Furthermore, cores of the same configuration can be used in the primary and secondary sides. Consequently, the number of the kinds of the parts can be reduced. This is very advantageous in production management.

In the embodiment, since the cores 11 and 21 are wound on the column-like connecting portions 11*b* and 21*b*, the coils 12 and 22 can be densely wound without forming a useless space between the coils 12 and 22 and the cores 11 and 21. In order to attain the state where the flat tip end faces of the junction legs 21*a* and 11*a* of the counter units are respectively joined to the column-like connecting portions 11*b* and 21*b*, moreover, the flat faces 11*c* and 21*c* are formed on the connecting portions 11*b* and 21*b*. Therefore, the tip end faces of the junction legs 21*a* and 11*a* can be closely contacted with the flat faces 11*c* and 21*c*, thereby obtaining an effective magnetic coupling state.

<Second embodiment>

Figure 4:
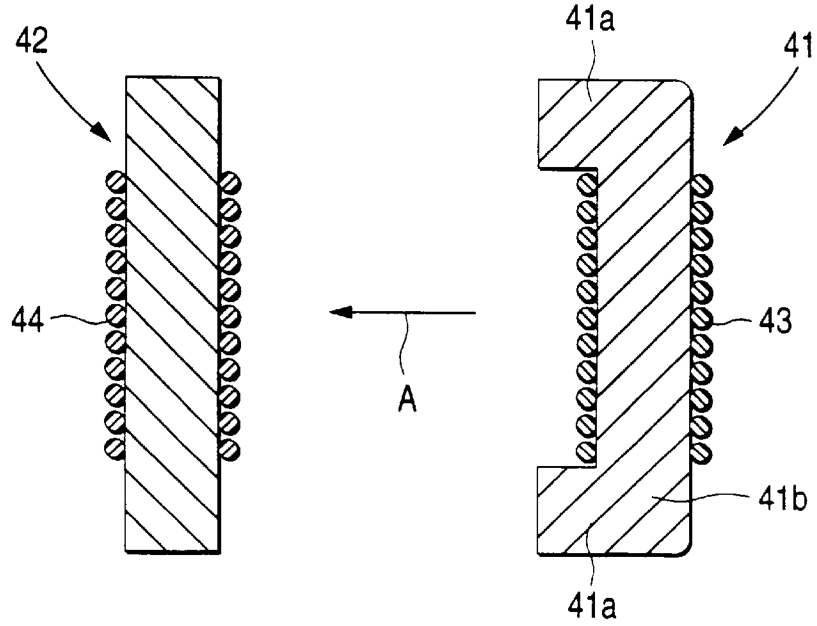
FIG. 4 is a longitudinal section view of coil units used in a second embodiment.
Figure 5:
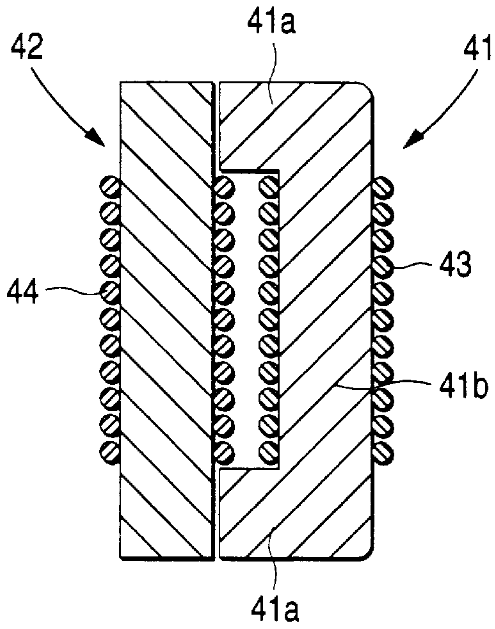
FIG. 5 is a longitudinal section view of the coupling state in the embodiment.

FIGS. 4 and 5 show a second embodiment of the invention. In the embodiment, the shapes of primary and secondary cores 41 and 42 are different from those in the first embodiment. The primary core 41 is a C-type core in which two junction legs 41*a* are respectively formed at the ends of a connecting portion 41*b*, and the secondary core 42 is an I-type core which linearly elongates. Both the cores have a prism-like shape. When the primary core 41 is moved in the direction of the arrow A of FIG. 4, the tip end faces of the junction legs 41*a* abut against the side end faces of the secondary core 42, thereby constituting a magnetic circuit of a rectangular frame-like closed loop such as shown in FIG. 5. In the primary core 41, a primary coil 43 is wound on the connecting portion 41*b*. A secondary coil 44 is wound on the secondary core 42 except for the junction faces at the ends.

Also in the embodiment, in the same manner as the first embodiment, the junction faces of the cores 41 and 42 perpendicularly intersect with the attaching direction A, and hence the attachment of the primary unit can be attained in a state where the cores 41 and 42 are opposed each other. Therefore, it is not required to deeply insert the primary core 41, with the result that the depth of the secondary unit can be reduced. Furthermore, since each of the coils 43 and 44 is wound in the form of a single layer, the depth in the attaching direction A can be further reduced.

In this case, when the primary core 41 is formed so as to have a circular section shape, the primary coil 43 can be densely wound. Also in the secondary core 42, when the portion on which the secondary coil 44 is wound is formed so as to have a circular section shape and a flat face is formed in each of the junction portions to which the primary core 41 is to be joined, the junction portions can be closely contacted with those of the primary core 41, thereby improving the magnetic properties.

<Third embodiment>

Figure 6:
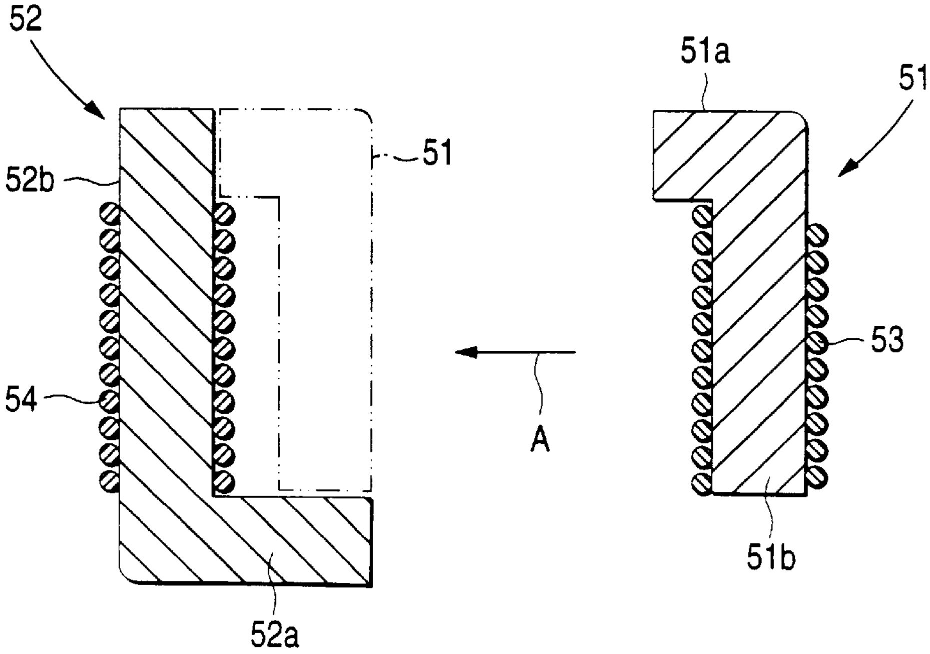
FIG. 6 is a longitudinal section view of the coupling state in a third embodiment.

FIG. 6 shows a third embodiment of the invention. Primary and secondary cores 51 and 52 have an L-like shape, but are different in size from each other. When the primary core 51 is attached in the direction of the arrow A, the primary and secondary cores 51 and 52 are joined to each other as indicated by the two-dot chain line in the figure.

The primary core 51 has a junction leg 51*a* which elongates in the attaching direction A to the secondary unit 20, and a connecting portion 51*b* which perpendicularly bends from the junction leg 51*a*. A primary coil 53 is wound on the connecting portion 51*b*. Similarly, the secondary core 52 has a junction leg 52*a* which elongates in the attaching direction A of the primary unit, and a connecting portion 52*b* which perpendicularly bends from the junction leg 52*a*. A secondary coil 54 is wound on the connecting portion 52*b*. One of the two core junction faces, i.e. the face which is positioned at the front end of the junction leg 51*a* of the primary core 51 perpendicularly intersects with the attaching direction A.

Also in the embodiment, therefore, it is not required to deeply insert the primary unit, with the result that the depth can be reduced. This contributes to the compactness of the device. Since both the cores 51 and 52 have a substantially L-like shape and the volume occupied by the cores 51 and 52 having a weight is small, the weight of the device can be reduced.

<Fourth embodiment>

Figure 7:
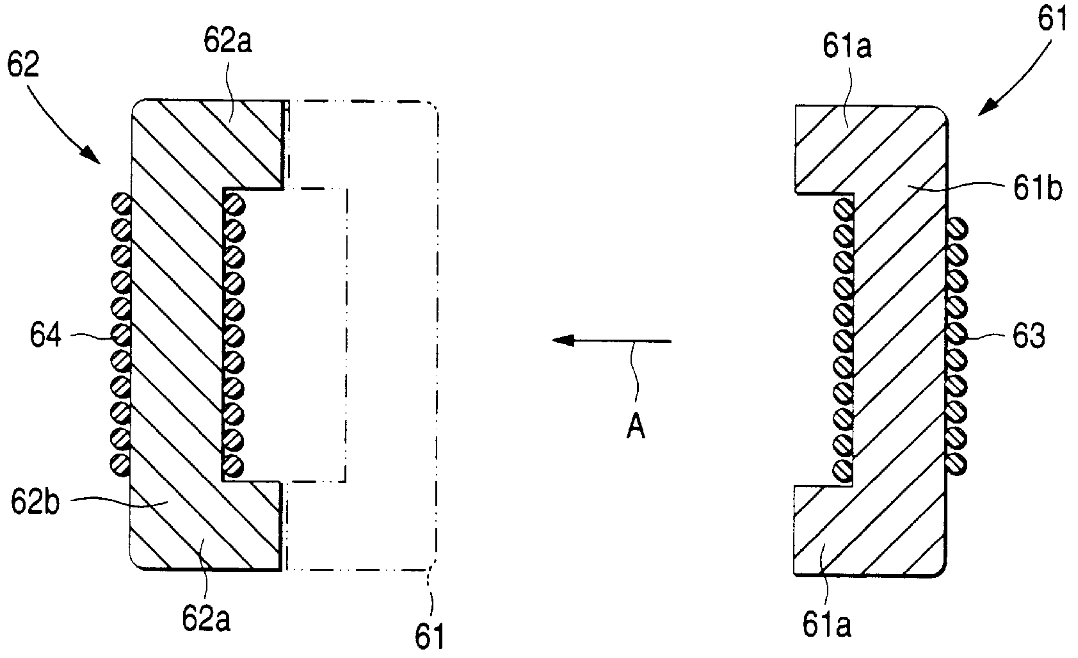
FIG. 7 is a longitudinal section view showing a fourth embodiment.

FIG. 7 shows a fourth embodiment of the invention.

In the embodiment, the shapes of primary and secondary cores 61 and 62 are different from those in the first embodiment. Both the primary and secondary core have a C-like shape.

The embodiment is similar to the first embodiment in that junction faces of the primary and secondary cores 61 and 62 perpendicularly intersect with the insertion direction A of the primary unit, that primary and secondary coils 63 and 64 are wound on connecting portions 61*b* and 62*b* which are continuous with junction legs 61*a* and 62*a* of the cores 61 and 62, respectively, and that the coils 63 and 64 are wound in the form of a single layer.

Also in the embodiment, in the same manner as the first embodiment, the units can be attached together in a state where the cores 61 and 62 are opposed each other. Therefore, the insertion stroke of the primary core 61 can be made smaller so that the depth of the secondary unit is reduced. Furthermore, since each of the coils 63 and 64 is wound in the form of a single layer, the depth in the attaching direction A can be further reduced. Moreover, the cores and coils of the same configuration can be used, and hence it is possible to attain the effect that the number of the kinds of the parts can be reduced.

<Fifth embodiment>

Figure 8:
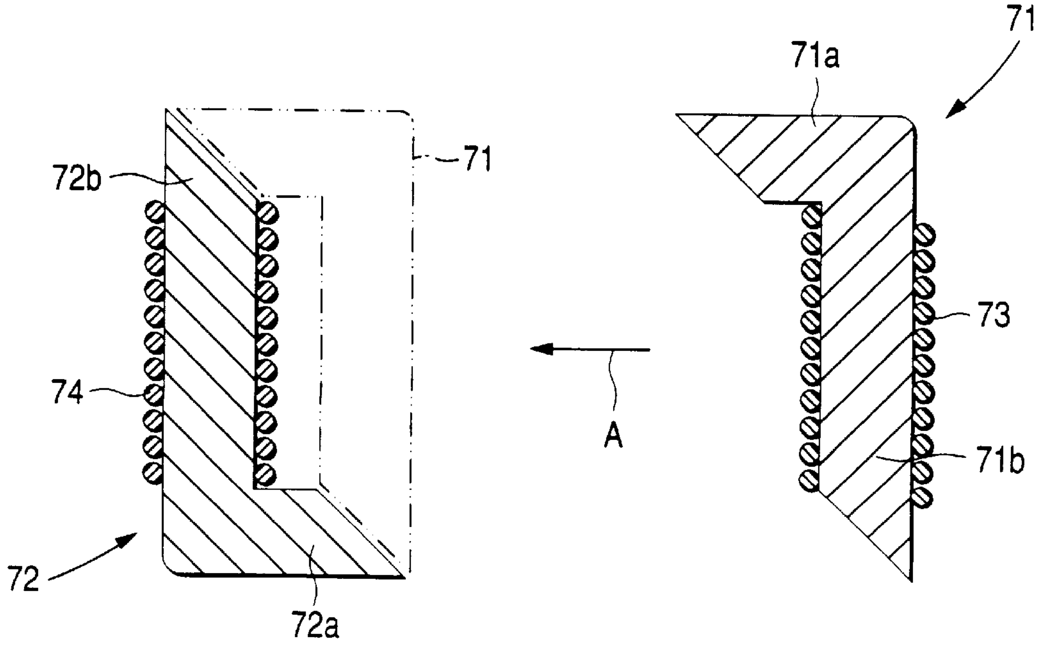
FIG. 8 is a longitudinal section view showing a fifth embodiment.

FIG. 8 shows a fifth embodiment of the invention. The embodiment is different from the first embodiment in that junction faces of primary and secondary cores 71 and 72 are slanted.

The cores 71 and 72 have a shape which is obtained by bending a prism or a column into a substantially L-like shape. The end faces of each of the cores 71 and 72 are slanted at an angle of about 45 deg. Consequently, the junction faces of the cores 71 and 72 intersect at an angle of 45 deg. with the attaching direction A of the primary unit. Coils 73 and 74 are wound on connecting portions 71*b* and 72*b* which are perpendicularly continuous with junction legs 71*a* and 72*a* elongating in the attaching direction A, respectively, and, in a coupling state, arranged in tandem in the attaching direction A.

Also the embodiment has a coupling structure of the opposing type, and hence the depth can be reduced. Since the coils 73 and 74 are wound in the form of a single layer, the device can be further compactly configured. Since the cores 71 and 72 have a substantially L-like shape and the same size, the volume occupied by the cores 71 and 72 having a weight is minimum, and hence the weight of the device can be reduced. Furthermore, cores of the same configuration can be used in the primary and secondary sides. Consequently, the number of the kinds of the parts can be reduced. This is very advantageous in production management.

<Sixth to ninth embodiments>

Figure 9:
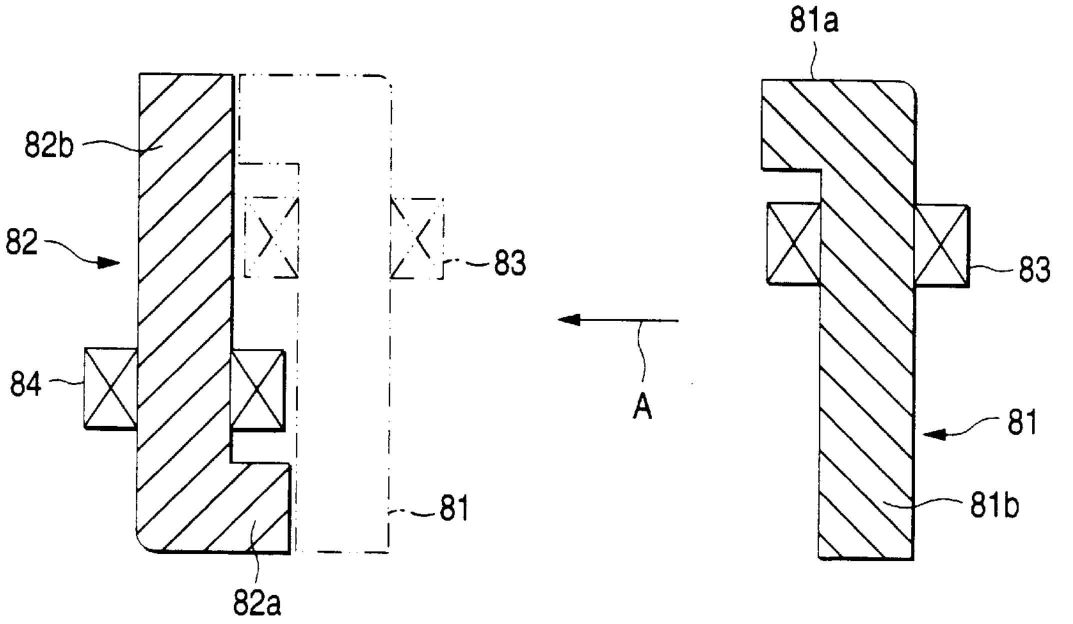
FIG. 9 is a longitudinal section view showing a sixth embodiment.

FIG. 9 shows a sixth embodiment of the invention. The embodiment is different from the first embodiment in the winding structure of coils. The embodiment is similar to the first embodiment in that primary and secondary cores 81 and 82 have an L-like shape, that junction faces of the cores 81 and 82 have a mutually opposing relationship in which the faces perpendicularly intersect with the attaching direction A of a primary unit, and that coils 83 and 84 are wound on connecting portions 81*b* and 82*b* which are bent from and continuous with junction legs 81*a* and 82*a* elongating in the attaching direction A. However, the coils 83 and 84 are wound on the connecting portions 81*b* and 82*b* with being shifted toward one end of respective one of the connecting portions, and the primary and secondary coils 83 and 84 are laterally arranged with respect to the attaching direction A of the primary unit in a state where the primary and secondary units are coupled to each other.

According to this configuration, even when the coils 83 and 84 are caused to have a larger outer diameter by forming a multilayer winding, for example, the halves of the coils laterally overlap with each other with respect to the attaching direction A. This produces an advantage that the device can be compactly configured as a whole.

Figure 10:
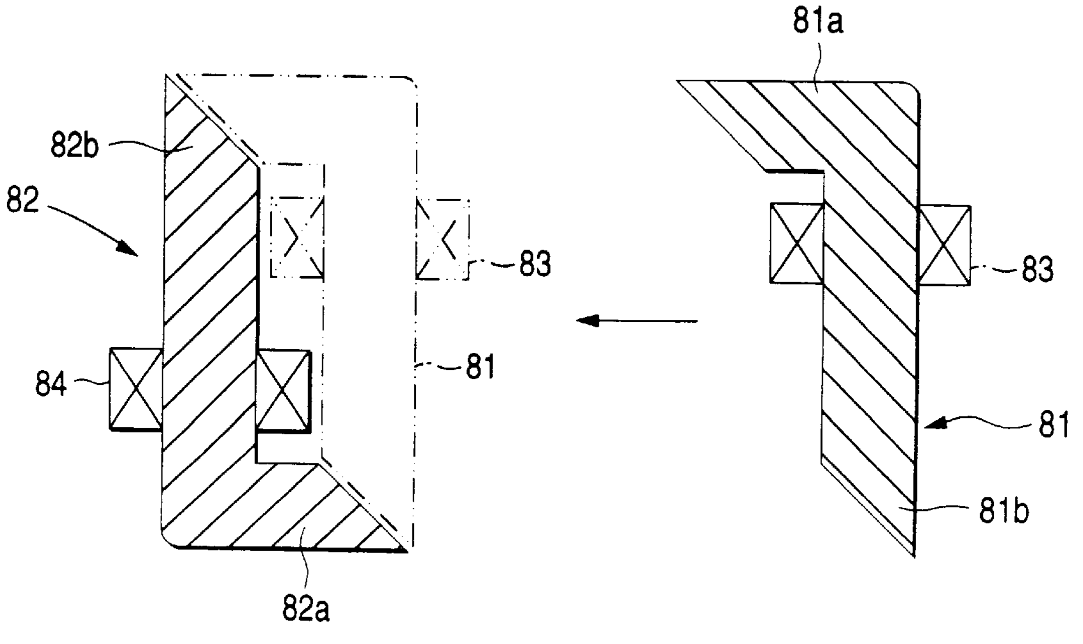
FIG. 10 is a longitudinal section view showing a seventh embodiment.
Figure 11:
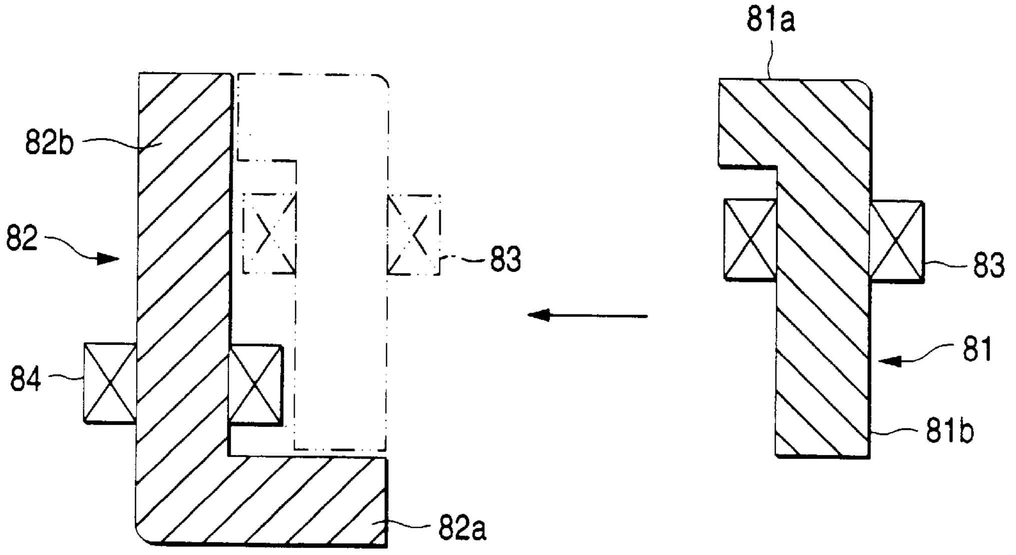
FIG. 11 is a longitudinal section view showing an eighth embodiment.
Figure 12:
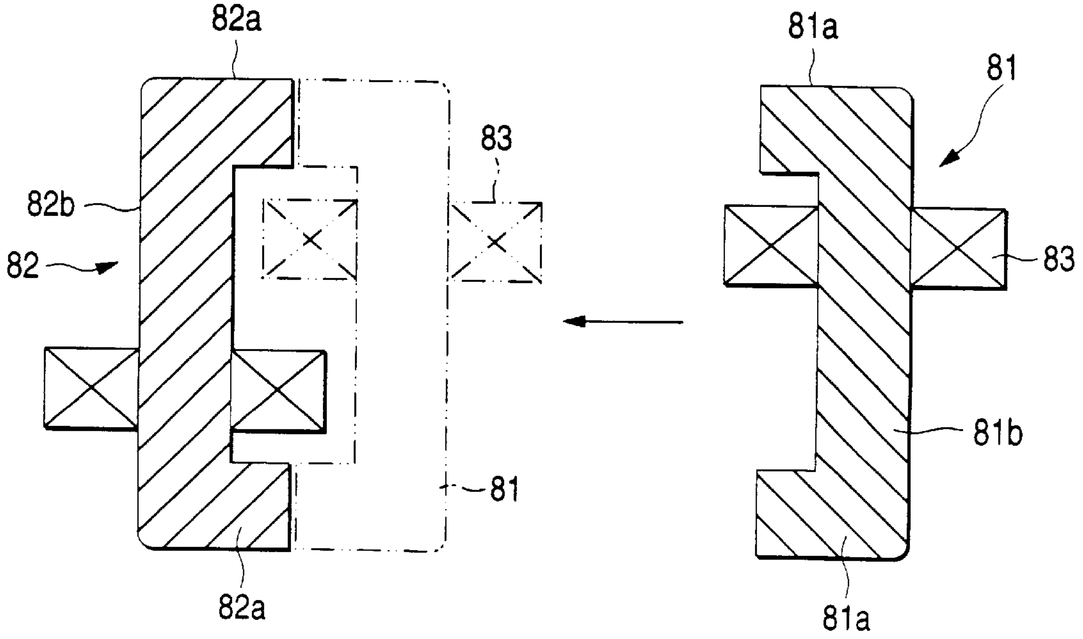
FIG. 12 is a longitudinal section view showing a ninth embodiment.

This coil structure may be similarly applied to a configuration in which cores have a shape different from that described above. The device may be configured as seventh to ninth embodiments shown in FIGS. 10 to 12. In the embodiments, cores and coils are designated by the same reference numerals as those used in the sixth embodiment.

<Tenth embodiment>

Figure 13:
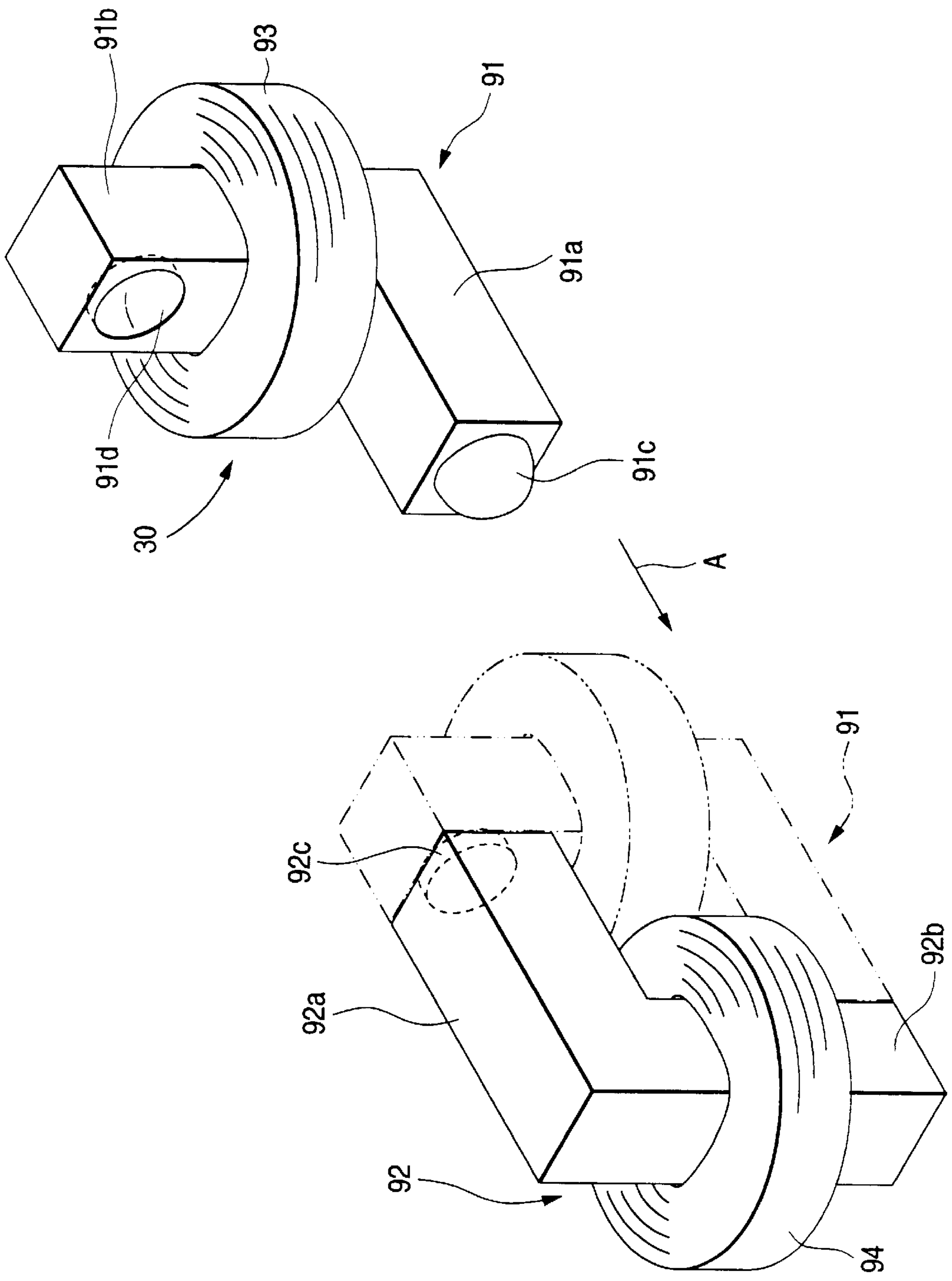
FIG. 13 is a perspective view showing a tenth embodiment.

FIG. 13 shows a tenth embodiment of the invention. In a primary core 91 having an L-like shape, a semispherical projection 91*c* for positioning is protruded from the tip end face of a junction leg 91*a* which elongates in a direction A of inserting a primary unit. A primary coil 93 is wound on a connecting portion 91*b* which is perpendicularly continuous with the junction leg 91*a*, and a semispherical recess 91*d* is formed in the tip end of the connecting portion 91*b*. A secondary unit is structured in the same manner as the primary unit. Namely, a semispherical projection 92*c* is protruded from the tip end face of a junction leg 92*a* of a secondary core 92 having an L-like shape, a secondary coil 94 is wound on a connecting portion 92*b*, and a semispherical recess (not shown) is formed in the tip end of the connecting portion 92*b*.

Also in the embodiment, a coupling structure of the opposing type is formed in the same manner as the embodiments described above, and hence the depth of the secondary unit 20 can be reduced. According to the embodiment, particularly, the following effect can be attained. Even if the primary and secondary units are deviated from each other when the semispherical projections 91*c* and 92*c* are caused to enter the counter recesses 91*d* and 92*d* by moving the primary unit in the direction of the arrow A, the deviation can be automatically corrected during the process of fitting the semispherical projections into the semispherical recesses, thereby enabling the cores to be joined to each other with attaining positional alignment.

<Eleventh embodiment>

Hereinafter, a eleventh embodiment in which the invention is embodied will be described with reference to FIGS. 14 to 17.

Figure 14:
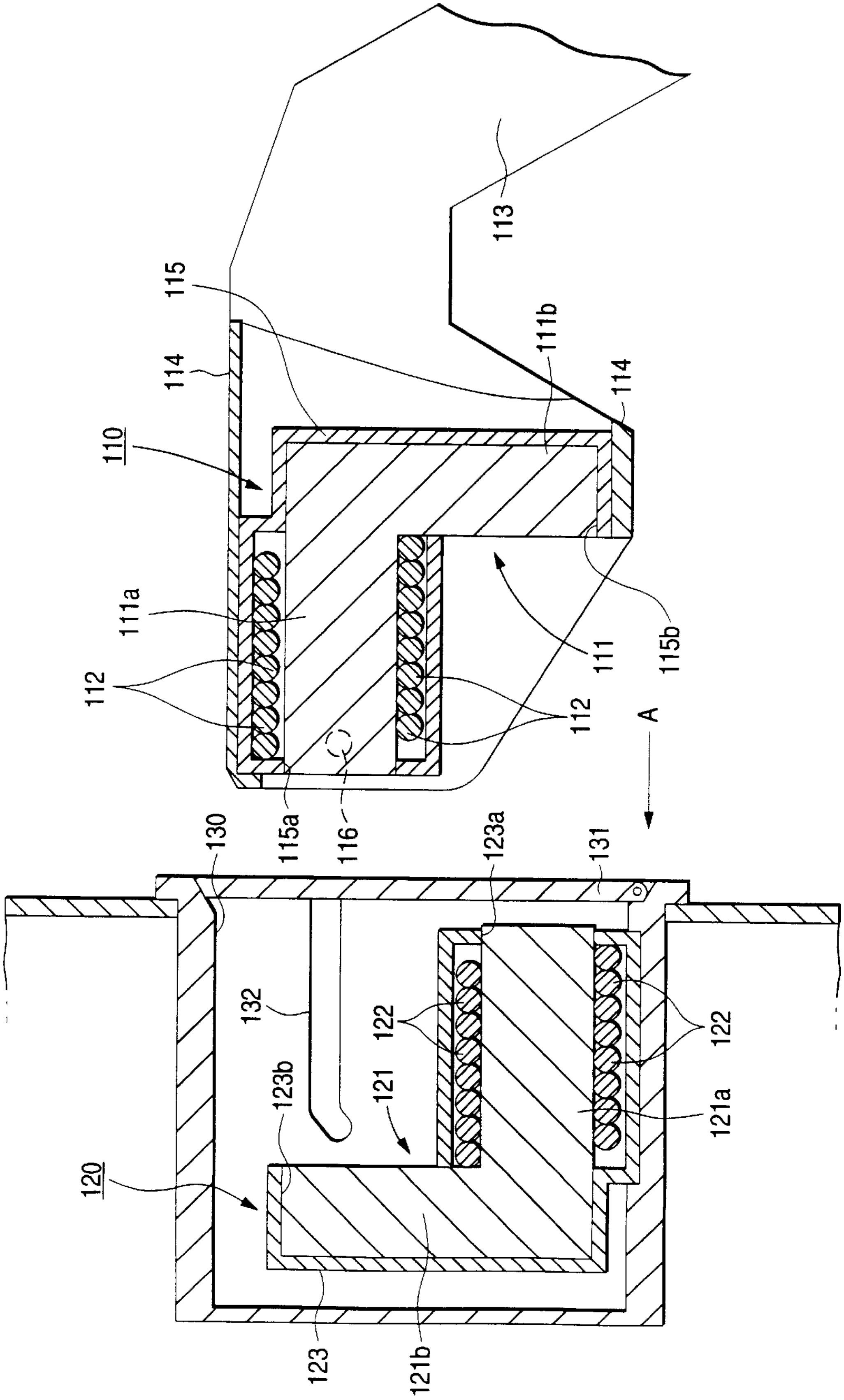
FIG. 14 is an exploded longitudinal section view showing a eleventh embodiment of the invention.
Figure 15:
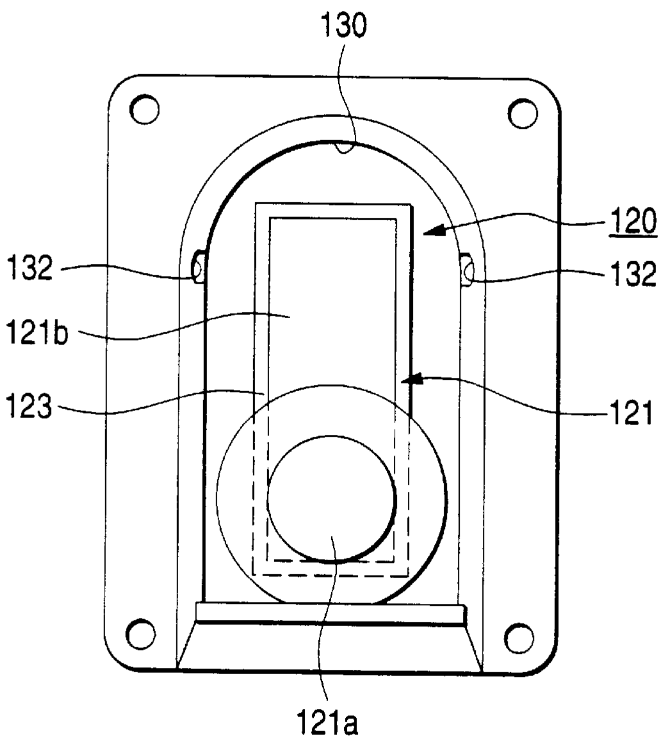
FIG. 15 is a front view showing a receiving unit and a secondary unit of the eleventh embodiment.

As shown in FIG. 14, the secondary core 121 has an L-like shape as seen from the side. The one side of the L-like shape which elongates in the attaching direction A (the lateral direction in the figure) of the primary unit 110 serves as a column portion 121*a* having a circular section shape, and the other side of the L-like shape which is perpendicular to the one side serves as a prism portion 121*b* having a rectangular section shape. The tip end face (junction face) of the column portion 121*a* perpendicularly intersects with the attaching direction A of the primary unit 110, and also a side face (junction face) of the prism portion 121*b* perpendicularly intersects with the attaching direction A. The secondary coil 122 is formed by winding a litz wire or the like in the form of a single layer and in a plural number of turns, and on the column portion 121*a* of the secondary core 121 which elongates in the attaching direction A. Therefore, the winding axis of the coil is parallel with the attaching direction A of the primary unit 110.

The secondary core 121 and the secondary coil 122 are housed in a protective case 123 made of a synthetic resin. The protective case 123 is fixed to the receiving unit 130, thereby fixing the core and the coil to the body of the vehicle. In the protective case 123, openings 123*a* and 123*b* for exposing the tip end face of the column portion 121*a* of the secondary core 121 and the side face of the tip end of the prism portion 121*b* are formed. The tip end of the column portion 121*a* is slightly protruded from the opening 123*a*.

On the other hand, the primary unit 110 has a primary core 111 and a primary coil 112 which are housed in a connector housing 114 having a handle 113. The primary core 111 is identical with the secondary core 121. A column portion 111*a* having a circular section shape is fixed to the connector housing 114 so as to elongate in the longitudinal direction (the attaching direction of the primary unit 110) of the connector housing 114. A prism portion 111*b* downward elongates. The tip end face (junction face) of the column portion 111*a* of the primary core 111 perpendicularly intersects with the attaching direction A of the primary unit 110, and also the side face (junction face) of the prism portion 111*b* intersects with the attaching direction A. The primary coil 112 is formed by winding a litz wire on the column portion 111*a* in the form of a single layer and in a plural number of turns in the same manner as the secondary coil 122, and the winding axis of the coil is parallel with the attaching direction A of the primary unit 110 in the same manner as the secondary unit 120. The primary unit 110 is housed in a protective case 115 and fixed to the connector housing 114 in the same manner as the secondary unit 120. The primary core 111 is partly exposed from openings 115*a* and 115*b* which are formed in the protective case 115.

Figure 16:
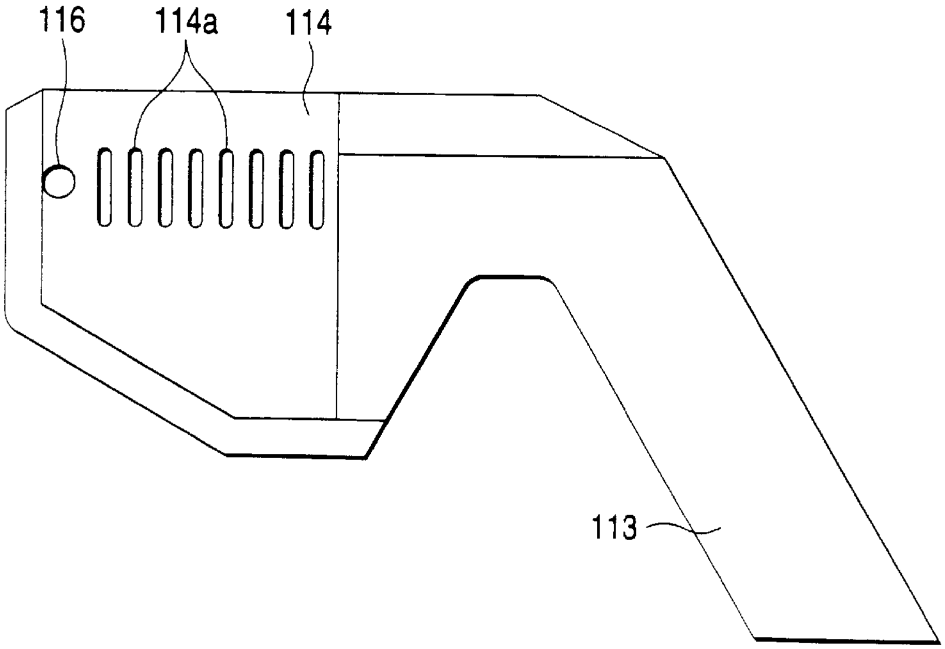
FIG. 16 is a side view of a primary unit of the eleventh embodiment.

As shown in FIG. 16, plural vent slits 114*a* are formed in the outer side face of the connector housing 114 in order to cool the primary unit 110 which is internally disposed. A guide projection 116 is protruded from each of the lateral side faces of the connector housing 114 and in the vicinity of the tip end of the housing. Guide grooves 132 are formed in the inner side faces of the receiving unit 130 so as to correspond with the guide projections 116. The tip end portion of each guide groove 132 is downward inclined. Although not illustrated, a lock mechanism for mechanically locking the primary unit 110 into the receiving unit 130 is disposed so that, during a period when the primary unit 110 is attached, the unit is prevented from accidentally slipping off.

The function of the thus configured embodiment will be described.

Figure 17:
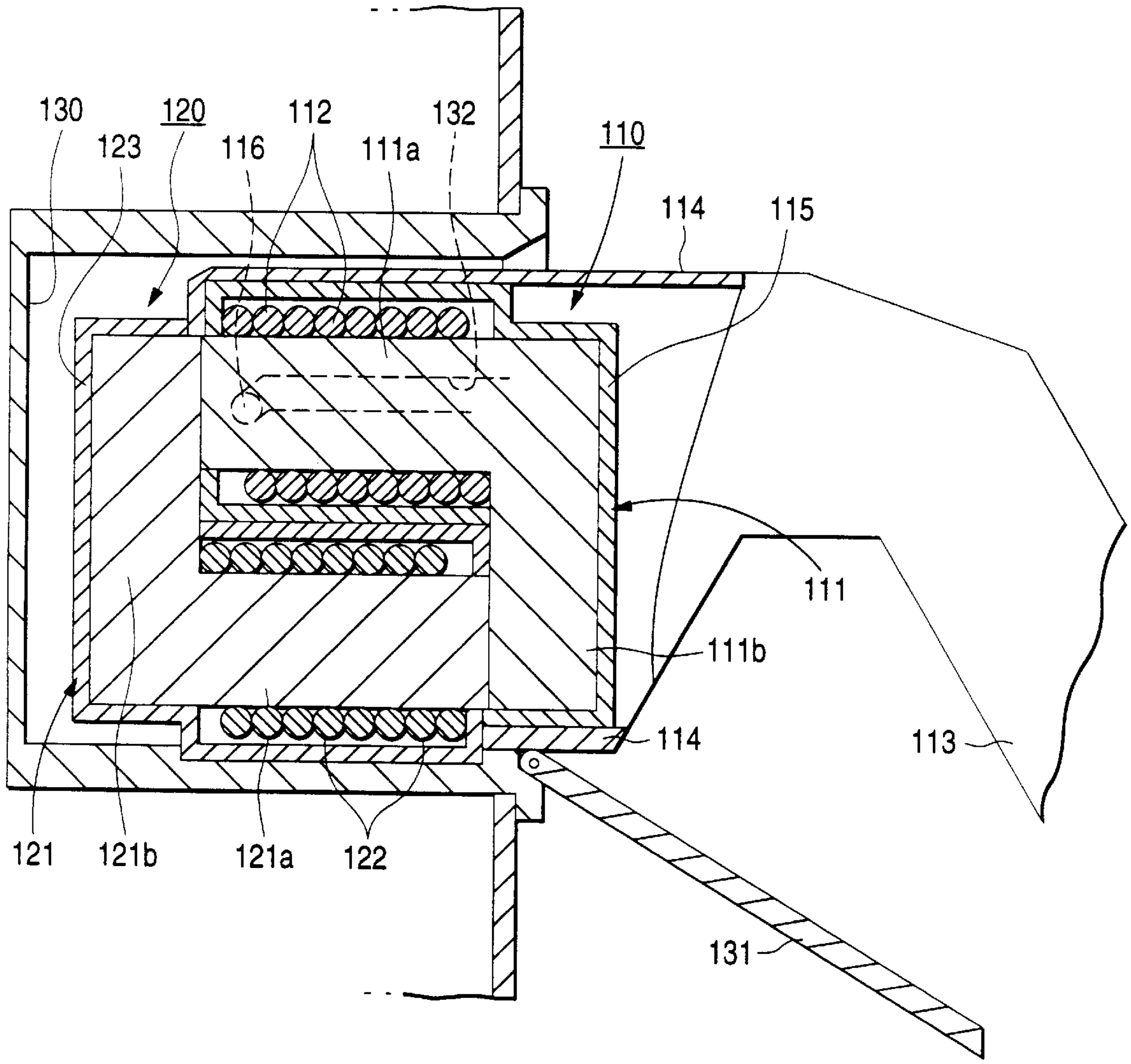
FIG. 17 is a longitudinal section view showing a coupling state of the primary and secondary units of the eleventh embodiment.

The lid 131 of the receiving unit 130 disposed on the body of the electric vehicle is opened, and the tip end of the connector housing 114 is inserted into the unit. As shown in FIG. 17, then, the tip end face of the column portion 111*a* of the primary core 111 abuts against the side face of the tip end of the prism portion 121*b* of the secondary core 121, and the tip end face of the column portion 121*a* of the secondary core 121 abuts against the side face of the tip end of the prism portion 111*b* of the primary core 111. As a result, a magnetic circuit of a rectangular frame-like closed loop is formed by the cores 111 and 121.

Under this state, the junction faces of the cores 111 and 121 have a mutually opposing relationship in which the faces perpendicularly intersect with the attaching direction A, and hence the coil units 110 and 120 are opposed each other. Consequently, the secondary unit 120 is required only to form the space for attachment of the primary unit 110 so as to be openable to the outside of the vehicle, and the space for insertion of the primary unit 110 is not necessary. As a result, the depth of the secondary unit can be largely reduced. Furthermore, the coils 112 and 122 are laterally arranged as a whole with respect to the attaching direction A. Therefore, the depth can be made further smaller than that of a configuration in which coils are arranged in tandem in an attached state. This contributes to the compactness of the device.

Since the cores 111 and 121 have a substantially L-like shape and the same size, the volume occupied by the cores 111 and 121 having a weight is minimum and the weight of the device can be reduced. Furthermore, cores of the same configuration can be used in the primary and secondary sides. Consequently, the number of the kinds of the parts can be reduced. This is very advantageous in production management.

In the embodiment, the cores 111 and 121 consist of the column portions 111*a* and 121*a* which elongate in the attaching direction A of the primary unit 110, and the prism portions 111*b* and 121*b* which are continuous with the column portions 111*a* and 121*a*, respectively. Consequently, the coils 112 and 122 are wound on the column portions 111*a* and 121*a*, respectively. This means that the coils 112 and 122 can be densely wound without forming a useless space between the coils 112 and 122 and the cores 111 and 121. Therefore, not only the coils 112 and 122 but also the primary and secondary units 110 and 120 can be compactly configured, thereby further miniaturizing these components. In spite of this configuration, the tip end faces of the column portions 111*a* and 121*a* are in contact with the flat faces of the prism portions 121*b* and 111*b*, and hence the primary and secondary cores 111 and 121 can be joined to each other without forming a gap, thereby suppressing the magnetic resistance. As a result, an effective magnetic coupling state can be obtained.

<Twelfth embodiment>

Figure 18:
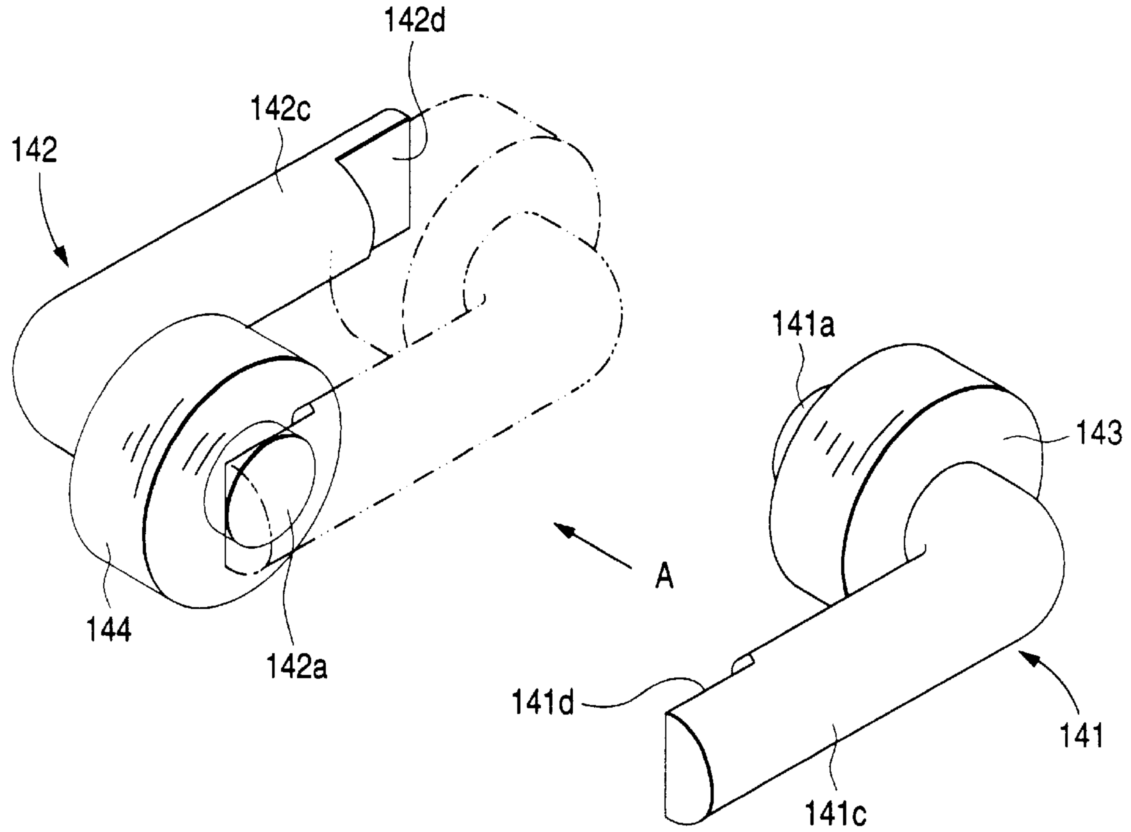
FIG. 18 is a perspective view of units of a twelfth embodiment.

FIG.18 shows a twelfth embodiment of the invention. In the embodiment, the shapes of the primary and secondary cores 141 and 142 are different from those of the eleventh embodiment In the eleventh embodiment, the cores 111 and 121 have the column portions 111*a* and 121*a* and the prism portions 111*b* and 121*b* respectively. In the present embodiment, cores 141 and 142 have a shape which is obtained by bending a round bar into an L-like shape. In this case, the column portions 141*a* and 142*a* of the short sides which elongate in the attaching direction A of the primary unit must be joined to the sides of column portions 141*c* and 142*c* of the long sides. Therefore, it is preferable to form flat faces 141*d* and 142*d* on the sides of the long sides, thereby allowing the tip end faces of the column portions 141*a* and 142*a* to be closely contacted with the flat faces 141*d* and 142*d*.

The embodiment is similar to the eleventh embodiment in that junction faces of the primary and secondary cores 141 and 142 perpendicularly intersect with the attaching direction A of the primary unit, and that primary and secondary coils 143 and 144 are laterally arranged as a whole with respect to the attaching direction A of the primary unit.

Also in the embodiment, therefore, the whole of the device can be compactly configured, and hence the device can be made smaller and lighter.

<Thirteenth embodiment>

Figure 19:
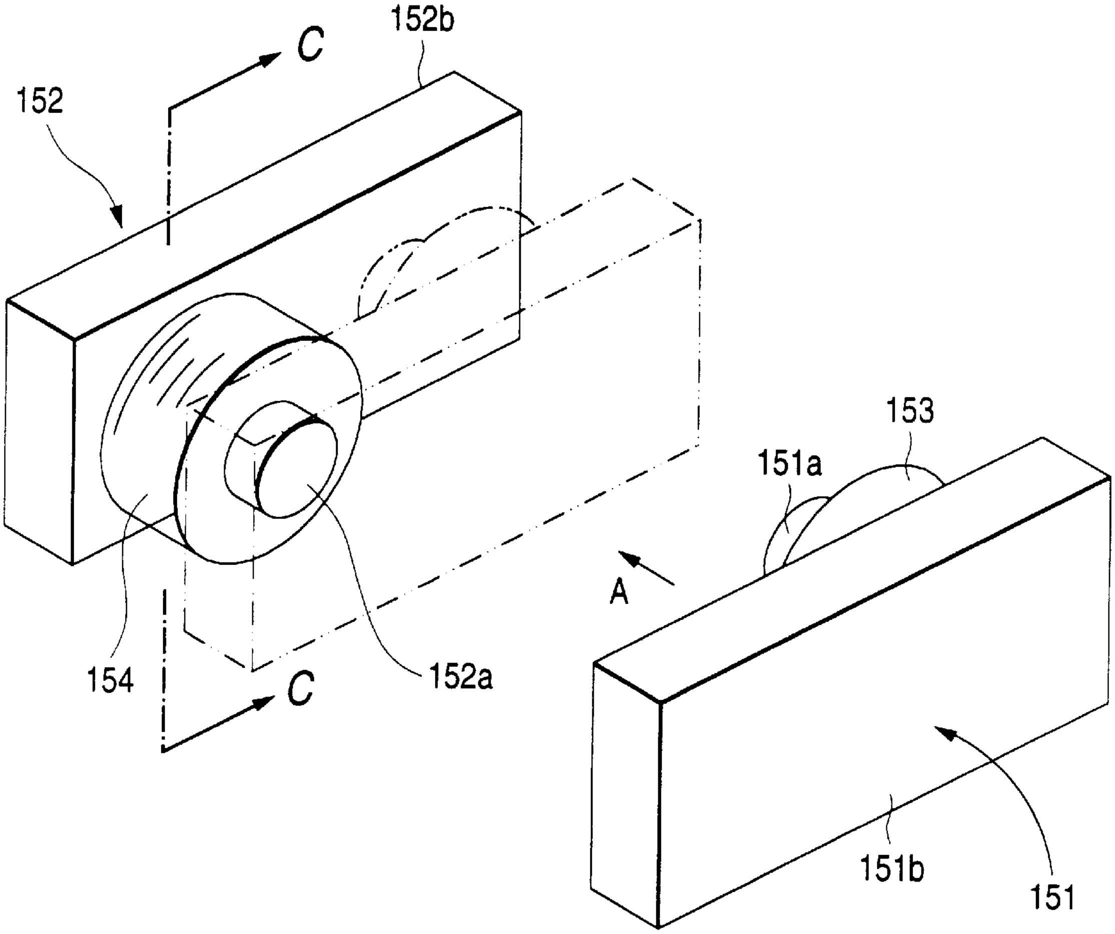
FIG. 19 is a perspective view of units of a thirteenth embodiment.
Figure 20:
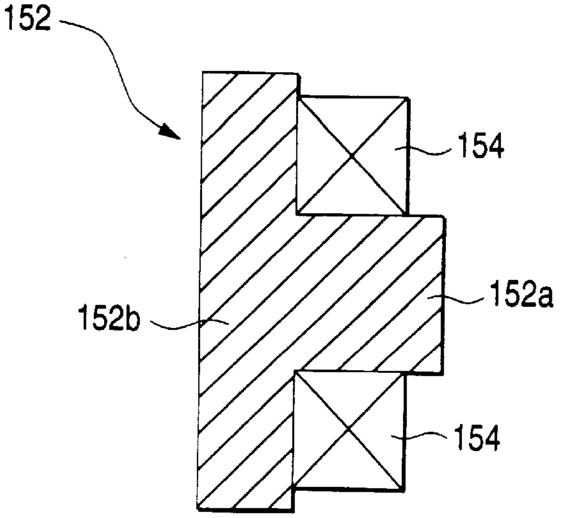
FIG. 20 is a section view taken along the line C—C of FIG. 19.

FIGS. 19 and 20 show a thirteenth embodiment of the inventions. The primary and secondary cores 151 and 152 have an L-like shape as a whole. The long sides of the cores are configured as flat prism portions 151*b* and 152*b*, and the short sides as column portions 151*a* and 152*a*. The widths of the prism portions 151*b* and 152*b* are larger than the outer diameters of coils 153 and 154 wound on the column portions 151*a* and 152*a*. The end faces of the coils 153 and 154 make surface-contact with the prism portions 151*b* and 152*b* of the cores 151 and 152 (see FIG. 20).

The embodiment is similar to the eleventh embodiment in that junction faces of the primary and secondary cores 151 and 152 perpendicularly intersect with the attaching direction A of the primary unit, and that primary and secondary coils 153 and 154 are laterally arranged with respect to the attaching direction A of the primary unit. Also in the embodiment, therefore, the depth can be made further smaller than that of a configuration in which coils are arranged in tandem in an attached state. This contributes to the compactness of the device.

Since the cores 151 and 152 have a substantially L-like shape and the same size, the volume occupied by the cores 151 and 152 having a weight is minimum and the weight of the device can be reduced. Furthermore, cores of the same configuration can be used in the primary and secondary sides. Consequently, the number of the kinds of the parts can be reduced. This is very advantageous in production management.

In the embodiment, the coils 153 and 154 are wound on the column portions 151*a* and 152*a*, respectively, and hence the coils 153 and 154 can be densely wound. This further contributes to miniaturization of the primary and secondary units. In spite of this configuration, the tip end faces of the column portions 151*a* and 152*a* are in contact with the flat faces of the prism portions 152*b* and 151*b*, and hence the primary and secondary cores 151 and 152 can be joined to each other without forming a gap, thereby suppressing the magnetic resistance. As a result, an effective magnetic coupling state can be obtained.

In the embodiment, furthermore, the end faces of the coils 153 and 154 are in contact with the cores 151 and 152, and hence the transfer of heat between the coils 153 and 154 and the cores 151 and 152 is accelerated so that a local temperature rise is prevented from occurring. When the coils 153 and 154 are cooled, for example, also the cores 151 and 152 can be cooled. In contrast, when the cores 151 and 152 are cooled, also the coils 153 and 154 can be cooled.

<Fourteenth embodiment>

Figure 21:
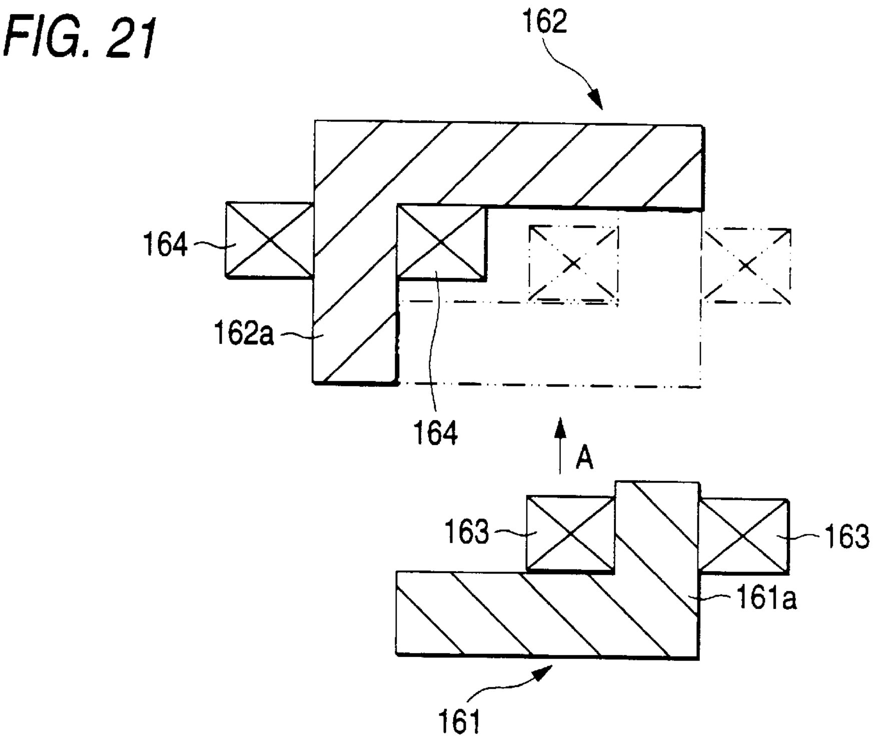
FIG. 21 is a section view of units of a fourteenth embodiment.

FIG. 21 shows a fourteenth embodiment. The cores 161 and 162 have an L-like shape but are different in size from each other. When the primary unit is attached in the direction of the arrow A, the primary and secondary cores 161 and 162 are joined to each other as indicated by the two-dot chain line in the figure. The primary and secondary coils 163 and 164 are wound on the sides 161*a* and 162*a* of the primary and secondary cores 161 and 162 which elongate in the attaching direction A of the primary unit. One of the two junction faces, i.e., the face which is positioned at the front end of the side 161*a* of the primary core 161 perpendicularly intersects with the attaching direction A.

Also in the embodiment, therefore, the depth can be made smaller than that of a configuration in which coils are arranged in tandem in an attached state. This contributes to the compactness of the device. Since the cores 161 and 162 have a substantially L-like shape, the volume occupied by the cores 161 and 162 having a weight is minimum, and hence the weight of the device can be reduced. Furthermore, the cores 161 and 162 are different in size from each other while they have an L-like shape, and the core 161 which is smaller is used in the primary side. This contributes to further miniaturization of the connector for charging. The decision on which one of the primary and secondary cores is to be made smaller may be arbitrarily done in accordance with the required specification. In the case where the secondary unit on the side of the electric vehicle is to be made smaller and lighter, the smaller core 161 may be used in the secondary side.

<Fifteenth embodiment>

Figure 22:
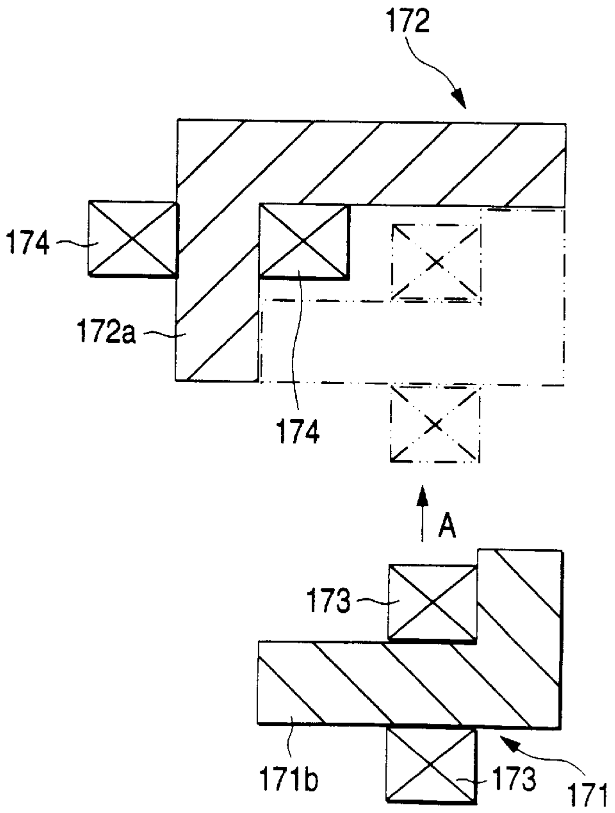
FIG. 22 is a section view of units of a fifteenth embodiment.

FIG. 22 shows a fifteenth embodiment of the invention. The primary and secondary cores 171 and 172 has an L-like shape in the same manner as those of the fourteenth embodiment.

By contrast, the primary coil 173 is wound on the other side 171*b* of the primary core 171 which perpendicularly intersects with the attaching direction A of the primary unit, and the secondary coil 174 is wound on the one side 172*a* which elongates in the attaching direction A. In this case, when the primary and secondary units are coupled to each other, one half of the primary coil 173 is laterally arranged with the secondary coil 174 in the attaching direction A.

Also in the embodiment, a coupling structure of the opposing type is formed, and hence the depth of the secondary unit can be reduced. Furthermore, the depth can be made smaller than that of a configuration in which coils are arranged in tandem in a state where the primary unit is attached. This contributes to the compactness of the device. Since the cores 171 and 172 have a substantially L-like shape, the volume occupied by the cores 171 and 172 having a weight is small, and hence the weight of the device can be reduced.

<Sixteenth embodiment>

Figure 23:
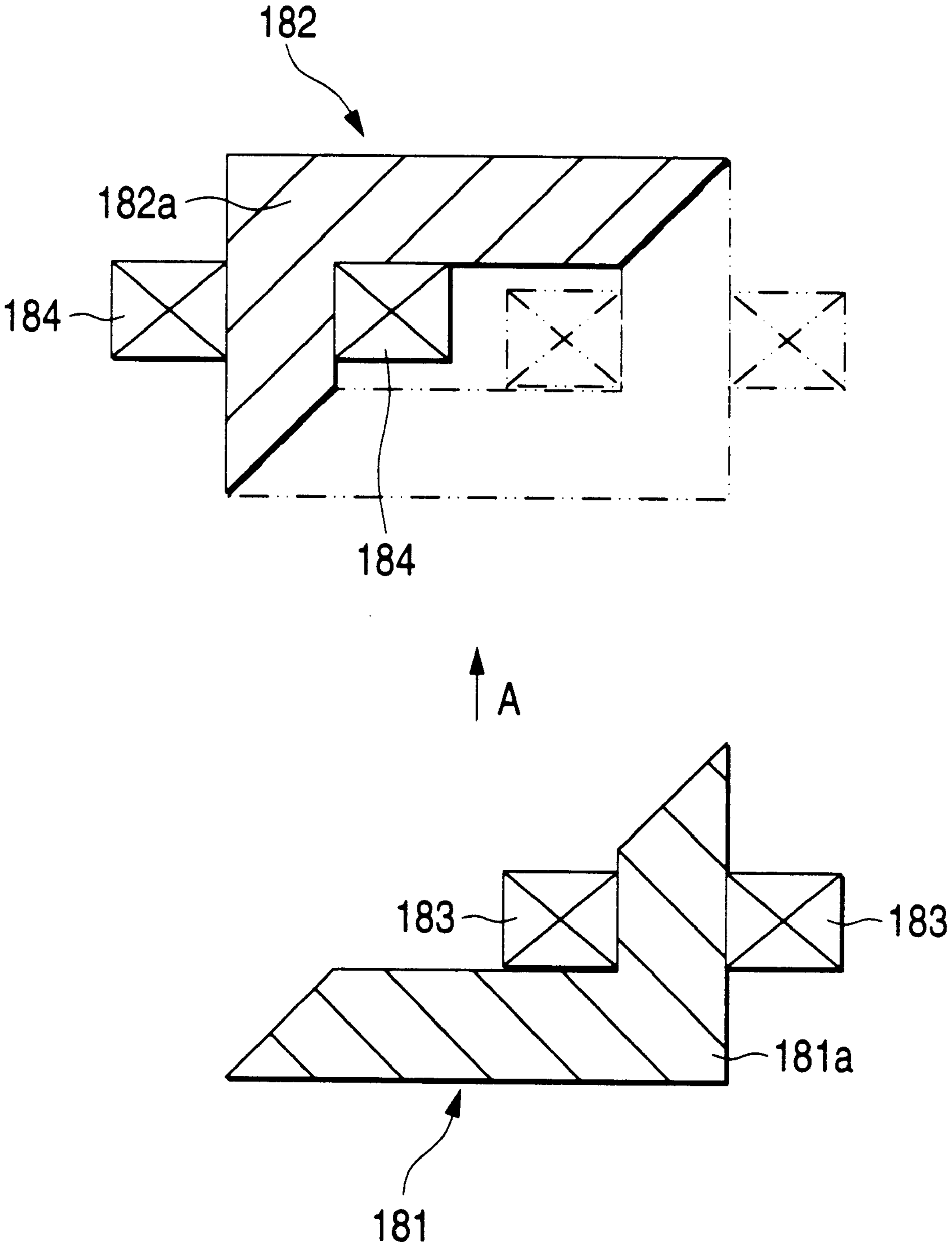
FIG. 23 is a section view of units of a sixteenth embodiment.

FIG. 23 shows a sixteenth embodiment of the invention.

The cores 181 and 182 have a shape which is obtained by bending a prism or a column into a substantially L-like shape. The end faces of each of the cores 181 and 182 are slanted at an angle of about 45 deg. Consequently, the junction faces of the cores 181 and 182 intersect at an angle of 45 deg. with the attaching direction A of the primary unit. The coils 183 and 184 are wound on the sides 181*a* and 182*a* elongating in the attaching direction A, respectively, and, in a coupling state, laterally arranged with respect to the attaching direction A.

Also in the embodiment, a coupling structure of the opposing type is formed, and hence the depth of the secondary unit can be reduced. Furthermore, the depth can be made smaller than that of a configuration in which coils are arranged in tandem in a state where the primary unit is attached. This contributes to the compactness of the device.

Since the cores 181 and 182 have a substantially L-like shape and the same size, the volume occupied by the cores 181 and 182 having a weight is minimum, and hence the weight of the device can be reduced. Furthermore, cores of the same configuration can be used in the primary and secondary sides. Consequently, the number of the kinds of the parts can be reduced. This is very advantageous in production management.

<Seventeenth embodiment>

Figure 24:
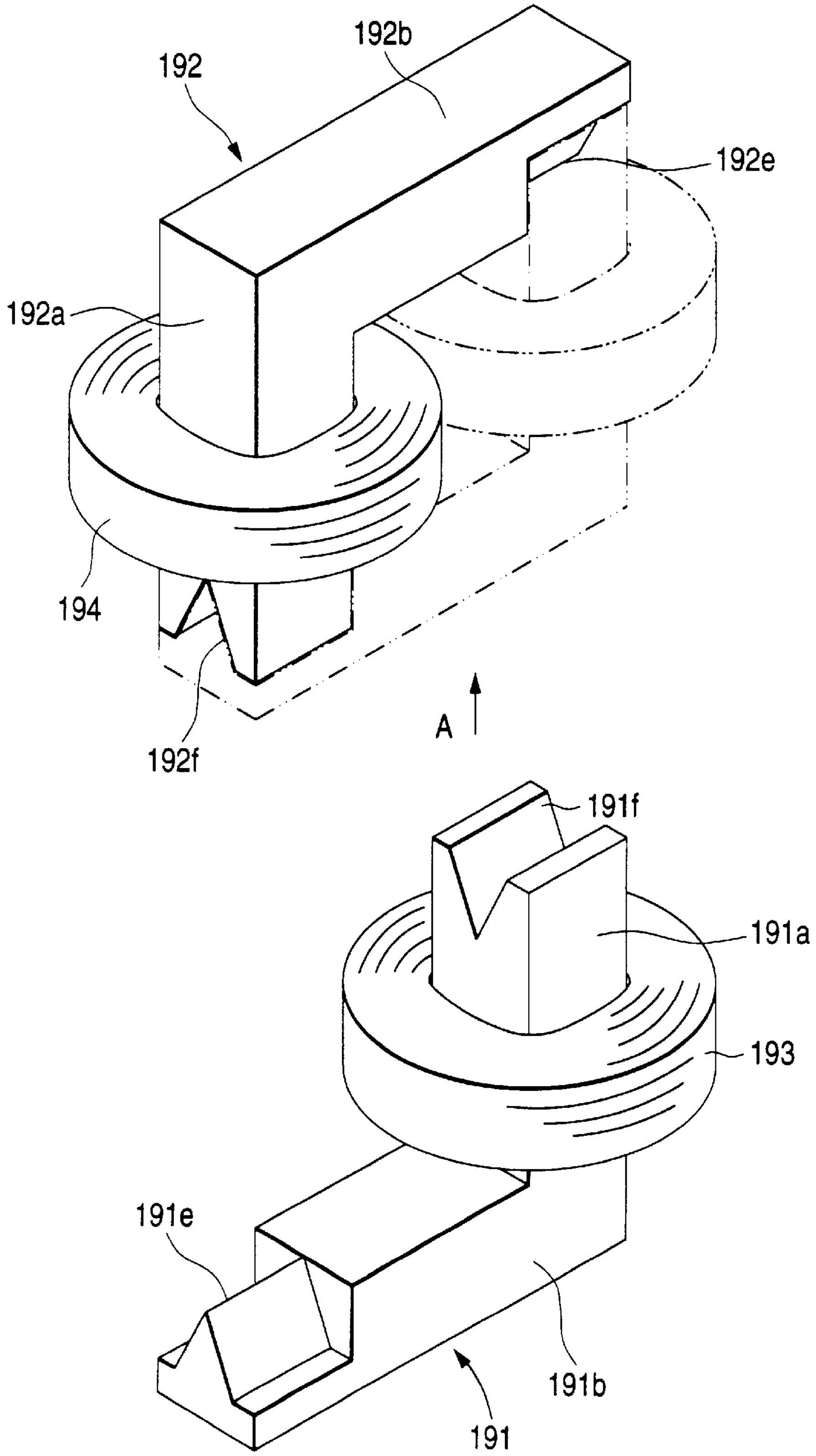
FIG. 24 is a perspective view of units of a seventeenth embodiment.

FIG. 24 shows a seventeenth embodiment of the invention.

A ridge 191*e* which elongates in the attaching direction A of the primary unit is formed on the tip end face of the one side 191*b* of the primary core 191, and a groove 191*f* into which a ridge 192*e* of the secondary unit is to be inserted in the attaching direction A of the primary unit is formed in the end portion of the other side 191*a* of the primary core 191. The primary coil 193 is wound on the other side 191*a* of the primary core 191. The secondary unit is configured in the same manner as the primary unit.

The ridge 191*e* has an inclined face on each side so that a section traversing with the elongating direction has a triangular shape. According to this configuration, when the cores 191 and 192 are urged so as to be close each other under the state where the ridge 191*e* is inserted into a groove 192*f*, the inclined faces cooperate so as to correctly align the cores 191 and 192.

The ridges 191*e* and 192*e* are not restricted to have a triangular section shape, and may have a semicircular section shape. Also in the alternative, the same effects described above can be attained.

Also in the embodiment, a coupling structure of the opposing type is formed in the same manner as the embodiments described above, and hence the depth of the secondary unit can be reduced. Furthermore, the depth can be made smaller than that of a configuration in which coils are arranged in tandem in a state where the primary unit is attached. This contributes to the compactness of the device. Since the cores 191 and 192 have a substantially L-like shape and the same size, the volume occupied by the cores 191 and 192 having a weight is minimum, and hence the weight of the device can be reduced. Furthermore, cores of the same configuration can be used in the primary and secondary sides. Consequently, the number of the kinds of the parts can be reduced. This is very advantageous in production control.

<Eighteenth embodiment>

Figure 25:
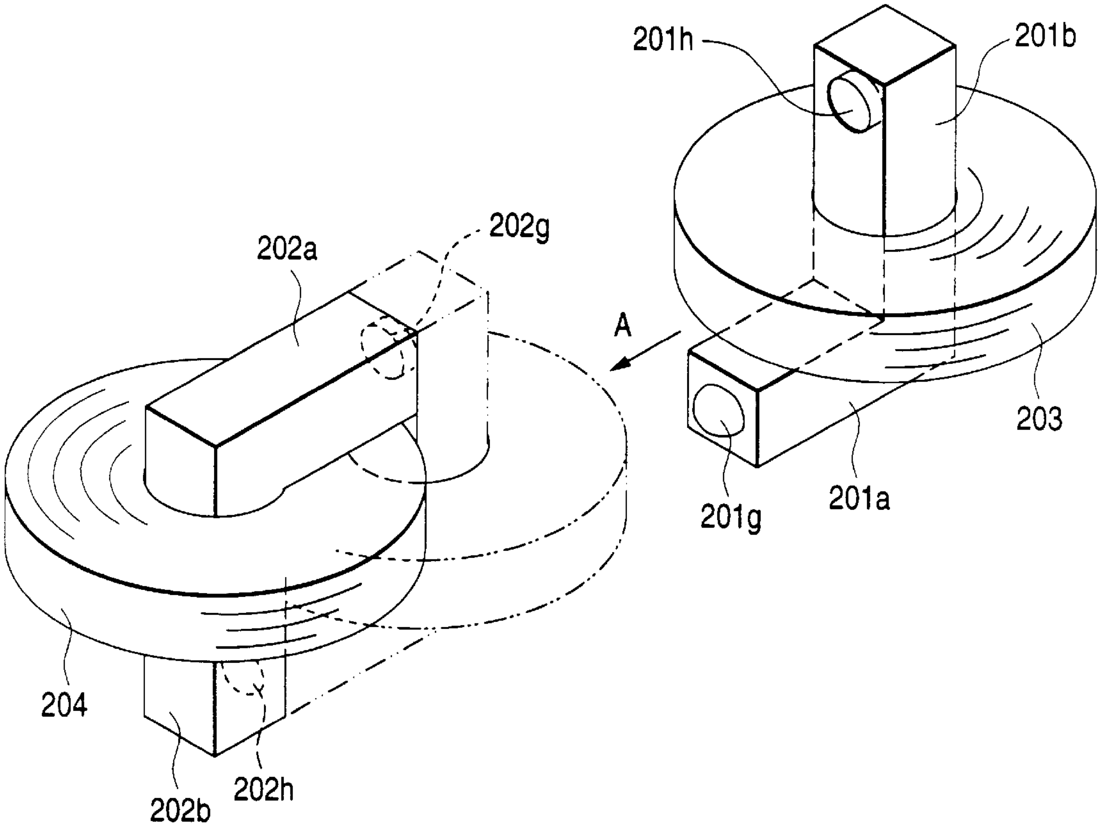
FIG. 25 is a perspective view of units of an eighteenth embodiment.

FIG. 25 shows an eighteenth embodiment. Also in the embodiment, the primary and secondary unit have the same shape.

A semispherical projection 201*g* for positioning is protruded from the tip end face of the one side 201*a* of the primary core 201. A semispherical recess 201*h* for receiving a semispherical projection 202*g* of the secondary unit is formed in the side face of the other side 201*b* which opposes the secondary unit. The primary coil 203 is wound on the other side 201*b* of the primary core 201.

Also in the configuration, a coupling structure of the opposing type is formed in the same manner as the embodiments described above, and hence the depth of the secondary unit can be reduced. Furthermore, parts of the primary and secondary coils 203 and 204 are laterally arranged. Consequently, the depth can be made smaller than that attained in the configuration wherein the coils are arranged in tandem. This contributes to the compactness of the device. Since the cores 201 and 202 have a substantially L-like shape and the same size, the volume occupied by the cores 201 and 202 having a weight is minimum, and hence the weight of the device can be reduced. Furthermore, cores of the same configuration can be used in the primary and secondary sides. Consequently, the number of the kinds of the parts can be reduced. This is very advantageous in production control.

According to the embodiment, particularly, the following effect can be attained. Even if the primary and secondary units are deviated from each other when the semispherical projection 201*g* is caused to enter the recess 202*h* by moving the primary unit in the direction of the arrow A, the deviation can be automatically corrected during the process of fitting the semispherical projection 201*g* into the recess 202*h*, thereby enabling the cores 201 and 202 to be joined to each other with attaining positional alignment. Since the projection 201*g* has a semispherical shape, the positioning function can be surely exerted even if the primary unit is deviated in any direction.

<Nineteenth embodiment>

Figure 26:
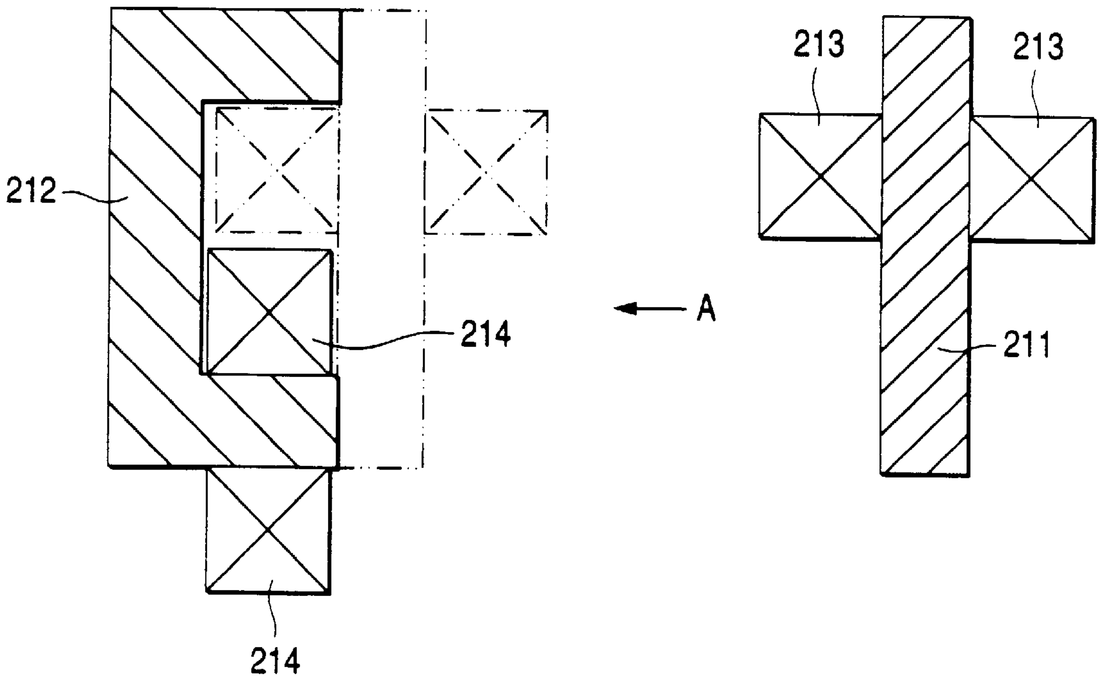
FIG. 26 is a section view of units of a nineteenth embodiment.
Figure 27:
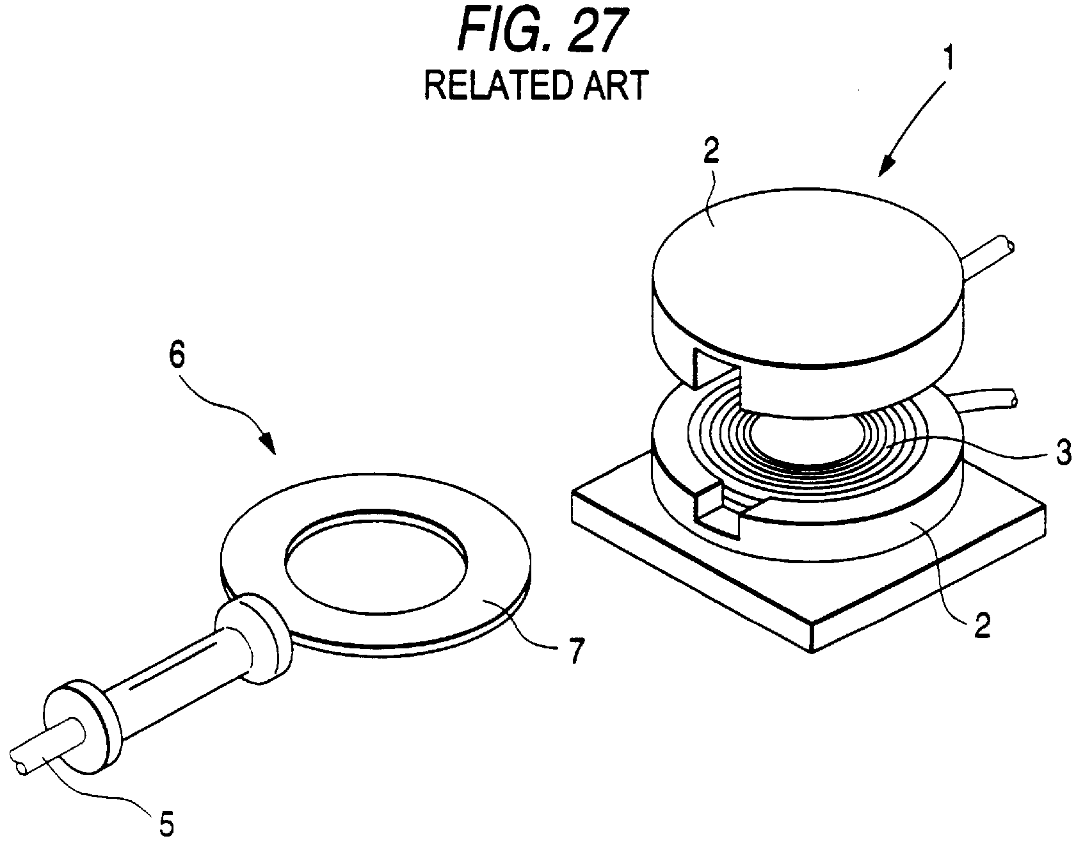
FIG. 27 RELATED ART
FIG. 27 is a perspective view showing a prior art magnetic coupling device for charging an electric vehicle.

FIG. 26 shows a nineteenth embodiment of the invention.

In the embodiment, the secondary core 221 of the secondary unit has a U-like shape, and the primary core 211 of the primary unit has an I-like shape. The junction faces of the cores perpendicularly intersect with the attaching direction A of the primary unit. The primary and secondary coils 213 and 214 are arranged so that, when the primary and secondary units are joined to each other, the halves of the coils laterally overlap with each other with respect to the attaching direction A.

Also in the configuration, a coupling structure of the opposing type is formed in the same manner as the embodiments described above, and hence the depth of the secondary unit can be reduced. Furthermore, parts of the primary and secondary coils 213 and 214 are laterally arranged.

Consequently, the depth can be made smaller than that attained in the configuration wherein the coils are arranged in tandem. This contributes to the compactness of the device. Also in this case, the secondary coil 214 may be wound in the same direction as the primary coil 213. In summary, at least parts of the primary and secondary coils 213 and 214 are requested to be laterally arranged.

<Other embodiments>

The invention is not restricted to the embodiments described above with reference to the drawings. For example, also the following embodiments are included in the technical scope of the invention. In addition to the following embodiments, the invention may be executed with being variously modified and within the scope of the invention.

(1) In the embodiments described above, the primary and secondary coils are formed by winding a usual magnet wire (litz wire). When a high-frequency current is supplied to the coils, the skin effect occurs and the center portion of the section of each coil substantially fails to function as a current path. By using this phenomenon, the following configuration may be employed in all the embodiments. For example, the coils may be configured by a hollow conductive pipe and a coolant such as water or oil for cooling the coils may be passed through the pipes.

The coils may be formed into a flat shape by using foil of a metal such as copper. Also in this case, the eddy current loss can be suppressed.

(2) In the first embodiment, the cores have a section shape which is truly circular. It is a matter of course that the cores may have an oval or elliptic section shape.

What is claimed is:

1. A magnetic coupling device for charging an electric vehicle comprising:

a primary unit having a primary core and a primary coil wound on said primary core; and a secondary unit having a secondary core and a secondary coil wound on said secondary core, said secondary unit disposed on the electric vehicle and coupled with said primary unit, so that said primary and secondary cores constitute a closed loop-like magnetic circuit; each of said primary and secondary cores having a junction face which contacts with each other under the coupling, said primary unit coupled with said secondary unit in an attaching direction of said primary unit along an attaching axis at least parts of the primary and secondary coils being laterally arranged with respect to the attaching direction of the primary unit;

wherein said junction faces of said primary and secondary cores have a mutually opposing relationship in which said junction faces intersect with the attaching axis.

2. A magnetic coupling device for charging an electric vehicle according to claim 1, at least one of said primary and secondary cores comprising:

a junction leg which elongates in the attaching direction of said primary unit; and a connecting portion which is continuous with said junction leg in a bent state, wherein said coil corresponding to said one core is wound on said connecting portion of said one core.

3. A magnetic coupling device for charging an electric vehicle according to claim 2, wherein each of said primary and secondary cores has a substantially L-like shape in which said connecting portion is perpendicularly continuous with said junction leg.

4. A magnetic coupling device for charging an electric vehicle according to claim 3, wherein, in each of said primary and secondary cores, said connecting portion has a column-like shape, and a flat face is formed in a side portion of said connecting portion against which a tip end of said junction leg of said core of the counter unit abuts.

5. A magnetic coupling device for charging an electric vehicle according to claim 4, wherein a width of said flat face is equal to or smaller than a diameter of said connecting portion.

6. A magnetic coupling device for charging an electric vehicle according to claim 2, wherein each of said coils is wound in the form of a single layer on respective one of said connecting portions, and said primary and secondary coils are disposed so as to be arranged in tandem in the attaching direction of said primary unit in a state where said primary and secondary units are coupled to each other.

7. A magnetic coupling device for charging an electric vehicle according to claim 2, wherein each of said primary and secondary coils is wound with being shifted toward one end of respective one of said connecting portions, and said primary and secondary coils are laterally arranged with respect to the attaching direction of said primary unit in a state where said primary and secondary units are coupled to each other.

8. A magnetic coupling device for charging an electric vehicle according to claim 1, wherein said primary and secondary cores have a substantially L-like shape and are equal in size to each other.

9. A magnetic coupling device for charging an electric vehicle according to claim 1, at least one of said primary and secondary cores comprising:

a junction leg which elongates in the attaching direction of said primary unit; and a connecting portion which is continuous with said junction leg in a bent state, wherein said coil corresponding to said one core is wound on said junction leg of said one core.

10. A magnetic coupling device for charging an electric vehicle according to claim 9, each of the primary and secondary cores is configured so that said junction leg is formed into a column-like shape, and said connection portion is formed into a prism-like shape.

* * * * *